(12) United States Patent
Hattori et al.

(10) Patent No.: US 7,507,450 B2
(45) Date of Patent: *Mar. 24, 2009

(54) VARNISH FOR FORMING LIQUID CRYSTAL ALIGNMENT LAYER AND LIQUID CRYSTAL DISPLAY ELEMENT USING THE SAME

(75) Inventors: Takayuki Hattori, Ichihara (JP); Keizo Iwatani, Ichihara (JP); Nobuyuki Ootsuka, Ichihara (JP); Takashi Katoh, Ichihara (JP); Kenya Ito, Ichihara (JP); Nobumasa Ootake, Ichihara (JP); Kazuhiro Yoshida, Ichihara (JP)

(73) Assignee: Chisso Corporation, Osaka (JP)

( * ) Notice: Subject to any disclaimer, the term of this patent is extended or adjusted under 35 U.S.C. 154(b) by 264 days.

This patent is subject to a terminal disclaimer.

(21) Appl. No.: 11/363,175

(22) Filed: Feb. 28, 2006

(65) Prior Publication Data

US 2006/0204680 A1 Sep. 14, 2006

(30) Foreign Application Priority Data

Feb. 28, 2005 (JP) ............................. 2005-053806

(51) Int. Cl.
*C08L 83/00* (2006.01)
(52) U.S. Cl. ..................... 428/1.23; 428/1.32; 428/1.52; 524/588; 528/33; 528/38; 528/41
(58) Field of Classification Search ............... 428/1.23, 428/1.32, 1.52; 528/33, 37–38, 10, 41; 524/588; 556/450
See application file for complete search history.

(56) References Cited

U.S. PATENT DOCUMENTS

| 7,169,873 | B2 * | 1/2007 | Morimoto et al. | ............. | 528/37 |
| 7,373,060 | B2 * | 5/2008 | Satake et al. | ................ | 385/123 |
| 2005/0009982 | A1 * | 1/2005 | Inagaki et al. | ............... | 524/588 |
| 2006/0100410 | A1 * | 5/2006 | Ootake et al. | ................ | 528/33 |
| 2006/0204192 | A1 * | 9/2006 | Satake et al. | ................ | 385/123 |

FOREIGN PATENT DOCUMENTS

| JP | 2002-357831 | | 12/2002 |
| JP | 2004004612 A | * | 1/2004 |
| JP | 2004-331647 | | 11/2004 |
| JP | 2004-341165 | | 12/2004 |
| JP | 2005004177 A | * | 1/2005 |
| JP | 2005-62235 | | 3/2005 |
| JP | 2005-232024 | | 9/2005 |
| WO | WO 2004081085 A1 | * | 9/2004 |

OTHER PUBLICATIONS

Machine Translation of Hirai et al. (JP 2005-004177).*
Machine Translation of Yamamoto et al. (JP 2004-004612).*

* cited by examiner

*Primary Examiner*—Keith D Hendricks
*Assistant Examiner*—Sophie Hon

(74) *Attorney, Agent, or Firm*—Wenderoth, Lind & Ponack, L.L.P.

(57) ABSTRACT

A varnish for forming a liquid crystal alignment layer is prepared by formulating a polymer obtained by using a silsesquioxane derivative represented by the formula (1), and a solvent.

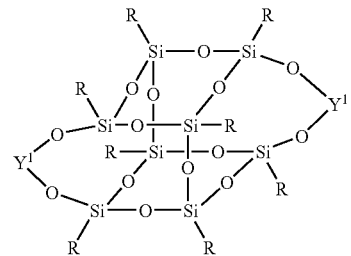

(1)

In the formula (1), R independently represents an unsubstituted phenyl, cyclopentyl, cyclohexyl, or t-butyl group, and $Y^1$ independently represents a group selected from the following formulae (a-1) to (a-6).

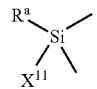

(a-1)

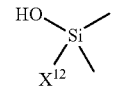

(a-2)

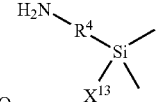

(a-3)

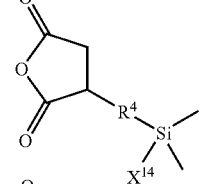

(a-4)

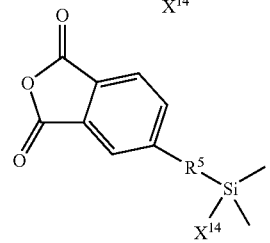

(A-5)

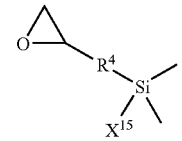

(a-6)

12 Claims, No Drawings

VARNISH FOR FORMING LIQUID CRYSTAL ALIGNMENT LAYER AND LIQUID CRYSTAL DISPLAY ELEMENT USING THE SAME

FIELD OF THE INVENTION

The present invention relates to a varnish for forming a liquid crystal alignment layer and a liquid crystal display element having an alignment layer formed by using the varnish.

DESCRIPTION OF THE RELATED ART

A liquid crystal device which is used as optical modulation means to be mounted on a projection type display device including a liquid crystal projector or as a direct-view display device to be mounted on a portable phone has, for example, a constitution in which a liquid crystal layer is sandwiched between a pair of substrates arranged so as to be opposite to each other. An electrode for applying a voltage to the liquid crystal layer is formed on the liquid crystal layer side of each of those substrates. In such a liquid crystal device, an alignment layer which controls the arrangement of liquid crystal molecules at the time of no voltage application is formed on the outermost surface of the liquid crystal layer side of each of the substrates so that display is performed on the basis of a change in an arrangement of liquid crystal molecules in the presence and absence of voltage application.

Conventionally, an organic film composed of polyimide or the like whose surface is rubbed with a cloth or the like in a predetermined direction has been widely used as such an alignment layer as described above because of its excellent liquid crystal alignment ability (liquid crystal alignment control function). However, for example, when such an alignment layer is mounted on a projection type display device to be irradiated with light having a luminous flux density of about 2 to 10 lm/mm² and strong light intensity, the alignment layer is gradually decomposed by light or heat, so a liquid crystal alignment control function reduces and display quality also reduces. For example, after long-term use, a liquid crystal molecule comes to be less arranged at a desired pre-tilt angle. This problem is particularly remarkable when an organic polyimide film having an imide bond that is readily decomposed by light or heat is used. When such an alignment layer is mounted on a projection type display device, a liquid crystal device is generally exposed to a temperature of about 50 to 70° C.

To solve such a problem, a liquid crystal device has been proposed, in which an inorganic alignment layer composed of an inorganic material such as silicon oxide is used as an alignment layer and a liquid crystal molecule is aligned by the surface shape effect of the inorganic alignment layer. The inorganic alignment layer is formed by means of an oblique deposition method which comprises depositing an inorganic material from one direction on a substrate fixed at a certain angle and growing a columnar structure arranged at a predetermined angle with respect to the substrate. The inorganic alignment layer thus formed is superior in light resistance and heat resistance to an alignment layer constituted by an organic film such as polyimide, and can improve the durability of the liquid crystal device.

However, an inorganic alignment layer composed of an inorganic material such as silicon oxide has hygroscopic property, so water may enter the liquid crystal device to cause the corrosion of metal wiring in the liquid crystal device or the deterioration of a driver circuit in the device.

SUMMARY OF THE INVENTION

An object of the present invention is to provide an alignment layer having no hygroscopic property and excellent in light resistance.

The inventors of the present invention have made extensive studies in view of achieving the above-mentioned object. As a result, they have found that a liquid crystal alignment layer having no hygroscopic property and excellent in light resistance can be obtained by using a varnish for forming a liquid crystal alignment layer containing a polymer obtained by means of such silsesquioxane derivatives as shown below and a solvent, thereby completed the present invention.

It is an object of the present invention to provide a varnish for forming a liquid crystal alignment layer comprising:

a polymer obtained by reacting a silsesquioxane derivative represented by the formula (1-1) with at least one of the compounds selected from the group consisting of the compound represented by the formula (2-1), the compound represented by the formula (3-1), the compound represented by the formula (4-1), the compound represented by the formula (5-1), the compound represented by the formula (6-1) and the compound represented by the formula (7-1); and a solvent.

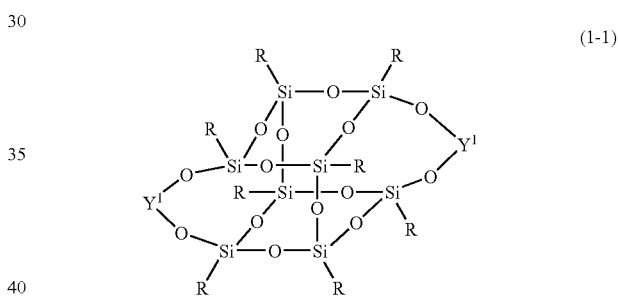
(1-1)

In the formula (1-1), R independently represents an unsubstituted phenyl, cyclopentyl, cyclohexyl, or t-butyl, and $Y^1$ represents a group represented by the formula (a-1).

(a-1)

$R^a$ represents vinyl, allyl, or styryl, and $X^{11}$ represents alkyl having 1 to 4 carbon atoms or an unsubstituted phenyl.

(2-1)

In the formula (2-1), $R^1$ represents an alkyl having 1 to 4 carbon atoms or unsubstituted phenyl, at least two of $X^{21}$ is hydrogen, and the remaining $X^{21}$ is $R^1$.

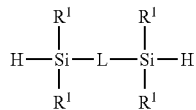
(3-1)

In the formula (3-1), $R^1$ independently represents an alkyl having 1 to 4 carbon atoms or unsubstituted phenyl, and L represents a single bond, —O—, —$CH_2$—, —$(CH_2)_2$—, —$(CH_2)_3$—, —$(CH_2)_4$—, 1,4-phenylene, 4,4'-diphenylene, 4,4'-oxy-1,1'-diphenylene, or a group represented by the formula (c).

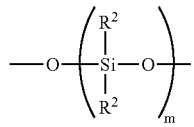
(c)

In the formula (c), $R^2$ independently represents a group defined in the same manner as $R^1$, and "m" represents an integer of 1 to 30.

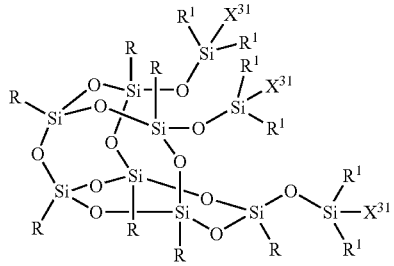
(4-1)

In the formula (4-1), R independently represents an unsubstituted phenyl, cyclopentyl, cyclohexyl, t-butyl, iso-butyl, or trifluoropropyl, $R^1$ independently represents an alkyl having 1 to 4 carbon atoms or unsubstituted phenyl, at least two of $X^{31}$ is hydrogen, and the remaining $X^{31}$ is $R^1$.

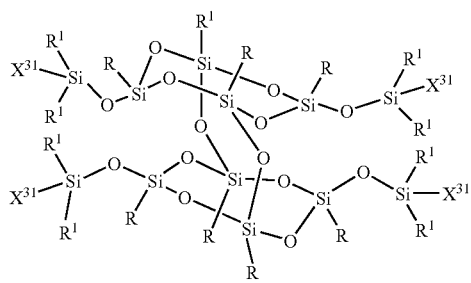
(5-1)

In the formula (5-1), R independently represents an unsubstituted phenyl, cyclopentyl, cyclohexyl, or t-butyl, $R^1$ represents an alkyl having 1 to 4 carbon atoms or unsubstituted phenyl, at least two Of $X^{31}$ is hydrogen, and the remaining $X^{31}$ is $R^1$.

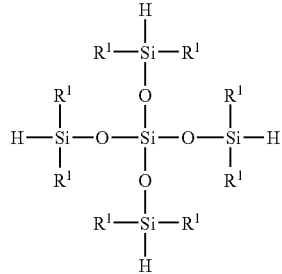
(6-1)

In the formula (6-1), $R^1$ represents an alkyl having 1 to 4 carbon atoms or unsubstituted phenyl.

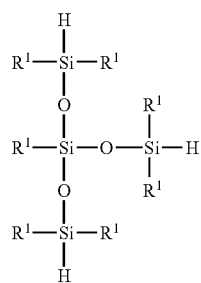
(7-1)

In the formula (7-1), $R^1$ represents an alkyl having 1 to 4 carbon atoms or unsubstituted phenyl.

It is a further object of the present invention to provide the above-described varnish, wherein R is an unsubstituted phenyl.

It is a further object of the present invention to provide a varnish for forming a liquid crystal alignment layer comprising:

a polymer obtained by reacting a silsesquioxane derivative represented by the formula (1-2) with a compound represented by the formula (8-2); and a solvent.

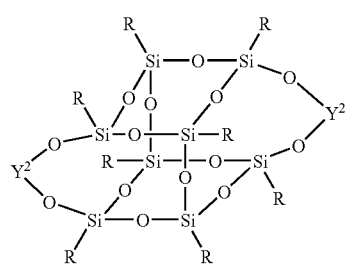
(1-2)

In the formula (1-2), R independently represents an unsubstituted phenyl, cyclopentyl, cyclohexyl, or t-butyl, and Y represents a group represented by the formula (a-2).

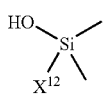
(a-2)

$X^{12}$ represents an alkyl having 1 to 4 carbon atoms or unsubstituted phenyl.

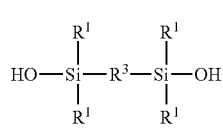
(8-2)

In the formula (8-2), $R^1$ represents an alkyl having 1 to 4 carbon atoms or unsubstituted phenyl, and $R^3$ represents a phenyl, naphthalene, or anthracene.

It is a further object of the present invention to provide the above-described varnish comprising a polymer obtained by reacting a silsesquioxane derivative represented by the formula (1-2) with a compound represented by the formula (8-2), wherein R is an unsubstituted phenyl.

It is a further object of the present invention to provide a varnish for forming a liquid crystal alignment layer comprising:

a polymer obtained by reacting a silsesquioxane derivative represented by the formula (1-3) with a carboxylic acid or epoxide; and a solvent.

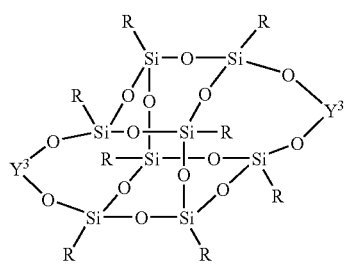
(1-3)

In the formula (1-3), R independently represents an unsubstituted phenyl, cyclopentyl, cyclohexyl, or t-butyl, and Y represents a group represented by the formula (a-3).

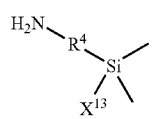
(a-3)

$R^4$ represents a divalent organic group having 1 to 20 carbon atoms, and $X^{13}$ represents an alkyl having 1 to 4 carbon atoms or unsubstituted phenyl.

It is a further object of the present invention to provide the above-described varnish comprising a polymer obtained by reacting a silsesquioxane derivative represented by the formula (1-3) with a carboxylic acid or epoxide, wherein R is an unsubstituted phenyl.

It is a further object of the present invention to provide a varnish for forming a liquid crystal alignment layer comprising:

a polymer obtained by reacting a silsesquioxane derivative represented by the formula (1-4) with a diamine; and a solvent.

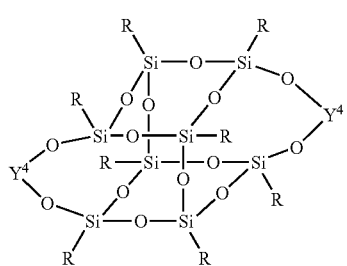
(1-4)

In the formula (1-4), R independently represents an unsubstituted phenyl, cyclopentyl, cyclohexyl, or t-butyl, and $Y^4$ independently represents a group represented by the formula (a-4) or (b-1).

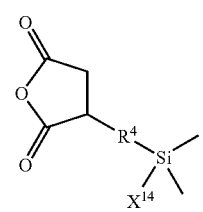
(a-4)

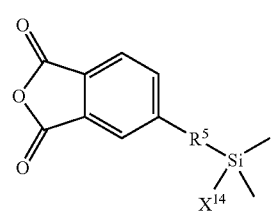
(b-1)

$R^4$ represents a divalent organic group having 1 to 20 carbon atoms, and $X^{14}$ represents an alkyl having 1 to 4 carbon atoms or unsubstituted phenyl. $R^5$ represents a single bond or a divalent organic group having 1 to 20 carbon atoms, and $X^{14}$ represents an alkyl having 1 to 4 carbon atoms or an unsubstituted phenyl.

It is a further object of the present invention to provide the above-described varnish comprising a polymer obtained by reacting a silsesquioxane derivative represented by the formula (1-4) with a diamine, wherein at least one kind of the diamine is a silsesquioxane derivative represented by the formula (9-1).

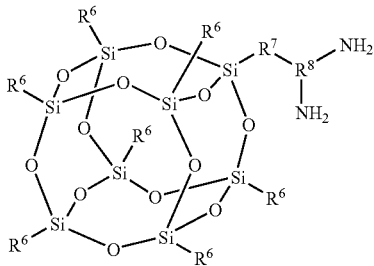

(9-1)

In the formula (9-1), $R^6$ independently represents an alkyl having 1 to 20 carbon atoms, alkenyl having 2 to 20 carbon atoms, or aryl having 6 to 20 carbon atoms, whereby optional —$CH_2$— may be replaced by —O—, and optional hydrogen may be replaced by halogen. $R^7$ represents a single bond or a divalent organic group having 1 to 15 carbon atoms, and $R^8$ represents a trivalent organic group having 1 to 15 carbon atoms.

It is a further object of the present invention to provide the above-described varnish comprising a polymer obtained by reacting a silsesquioxane derivative represented by the formula (1-4) with a diamine, wherein R is an unsubstituted phenyl.

It is a further object of the present invention to provide a varnish for forming a liquid crystal alignment layer comprising:

a polymer obtained by reacting a silsesquioxane derivative represented by the formula (1-3) with a silsesquioxane derivative represented by the formula (1-4); and a solvent.

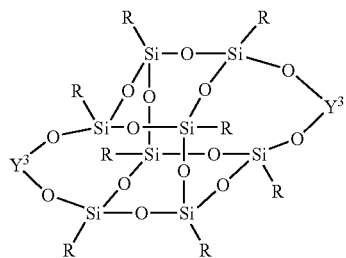

(1-3)

In the formula (1-3), R independently represents an unsubstituted phenyl, cyclopentyl, cyclohexyl, or t-butyl, and $Y^3$ represents a group represented by the formula (a-3).

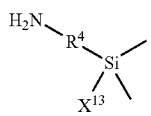

(a-3)

$R^4$ represents a divalent organic group having 1 to 20 carbon atoms, and $X^{13}$ represents an alkyl having 1 to 4 carbon atoms or unsubstituted phenyl.

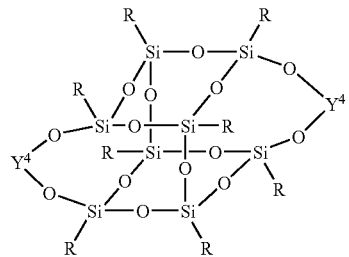

(1-4)

In the formula (1-4), R independently represents an unsubstituted phenyl, cyclopentyl, cyclohexyl, or t-butyl, and $Y^4$ independently represents a group represented by the formula (a-4) or (b-1).

(a-4)

(b-1)

$R^4$ represents a divalent organic group having 1 to 20 carbon atoms, and $X^{14}$ represents an alkyl having 1 to 4 carbon atoms or unsubstituted phenyl. $R^5$ represents a single bond or a divalent organic group having 1 to 20 carbon atoms, and $X^{14}$ represents an alkyl having 1 to 4 carbon atoms or unsubstituted phenyl.

It is a further object of the present invention to provide the above-described varnish comprising a polymer obtained by reacting a silsesquioxane derivative represented by the formula (1-3) with a silsesquioxane derivative represented by the formula (1-4), wherein R is an unsubstituted phenyl.

It is a further object of the present invention to provide a varnish for forming a liquid crystal alignment layer comprising:

a polymer obtained by reacting a silsesquioxane derivative represented by the formula (1-4) with a silsesquioxane derivative represented by the formula (1-5); and a solvent.

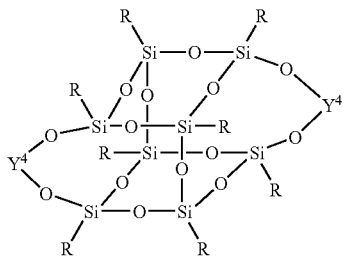
(1-4)

In the formula (1-4), R independently represents an unsubstituted phenyl, cyclopentyl, cyclohexyl, or t-butyl, and $Y^4$ independently represents a group represented by the formula (a-4) or (b-1)

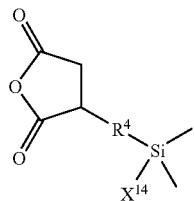
(a-4)

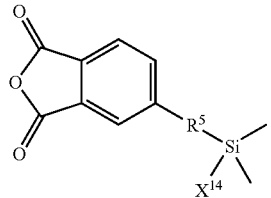
(b-1)

$R^4$ represents a divalent organic group having 1 to 20 carbon atoms, and $X^{14}$ represents an alkyl having 1 to 4 carbon atoms or unsubstituted phenyl. $R^5$ represents a single bond or a divalent organic group having 1 to 20 carbon atoms, and $X^{14}$ represents an alkyl having 1 to 4 carbon atoms or unsubstituted phenyl.

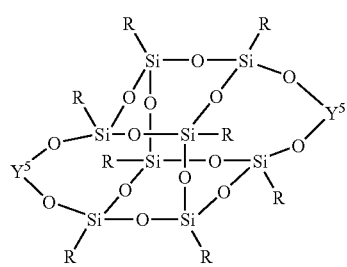
(1-5)

In the formula (1-5), R independently represents an unsubstituted phenyl, cyclopentyl, cyclohexyl, or t-butyl, and $Y^5$ represents a group represented by the formula (a-5).

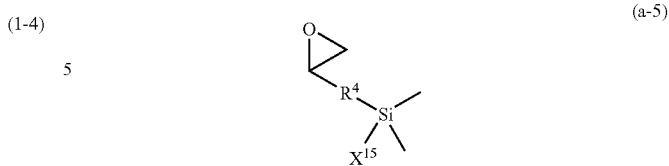
(a-5)

$R^4$ represents a divalent organic group having 1 to 20 carbon atoms, and $X^{15}$ represents an alkyl having 1 to 4 carbon atoms or unsubstituted phenyl.

It is a further object of the present invention to provide the above-described varnish comprising a polymer obtained by reacting a silsesquioxane derivative represented by the formula (1-4) with a silsesquioxane derivative represented by the formula (1-5), wherein R is an unsubstituted phenyl.

It is a further object of the present invention to provide a varnish for forming a liquid crystal alignment layer comprising:

a polymer obtained by reacting a silsesquioxane derivative represented by the formula (1-4) with a silsesquioxane derivative represented by the formula (9-1); and a solvent.

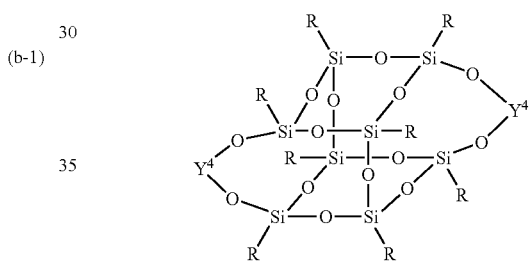
(1-4)

In the formula (1-4), R independently represents an unsubstituted phenyl, cyclopentyl, cyclohexyl, or t-butyl, and $Y^4$ independently represents a group represented by the formula (a-4) or (b-1).

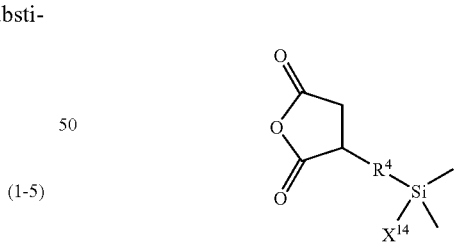
(a-4)

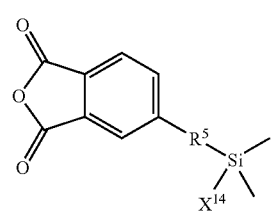
(b-1)

$R^4$ represents a divalent organic group having 1 to 20 carbon atoms, and $X^{14}$ represents an alkyl having 1 to 4 carbon atoms or unsubstituted phenyl. $R^5$ represents a single bond or a divalent organic group having 1 to 20 carbon atoms, and $X^{14}$ represents an alkyl having 1 to 4 carbon atoms or unsubstituted phenyl.

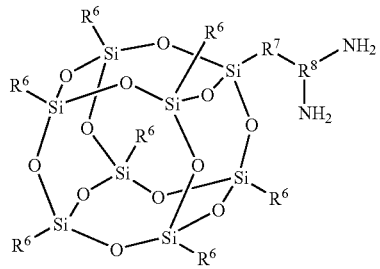

(9-1)

In the formula (9-1), $R^6$ independently represents an alkyl having 1 to 20 carbon atoms, alkenyl having 2 to 20 carbon atoms, or aryl having 6 to 20 carbon atoms, whereby optional —$CH_2$— may be replaced by —O—, and optional hydrogen may be replaced by halogen. $R^7$ represents a single bond or a divalent organic group having 1 to 15 carbon atoms, and $R^8$ represents a trivalent organic group having 1 to 15 carbon atoms.

It is a further object of the present invention to provide the above-described varnish comprising a polymer obtained by reacting a silsesquioxane derivative represented by the formula (1-4) with a silsesquioxane derivative represented by the formula (9-1), wherein $R^6$ independently represents a fluoroalkyl or fluoroaryl.

It is a further object of the present invention to provide the above-described varnish comprising a polymer obtained by reacting a silsesquioxane derivative represented by the formula (1-4) with a silsesquioxane derivative represented by the formula (9-1), wherein $R^6$ independently represents trifluoromethyl, 3,3,3-trifluoropropyl, 3,3,4,4,5,5,6,6,6-nonafluorohexyl, tridecafluoro-1,1,2,2-tetrahydrooctyl, heptadecafluoro-1,1,2,2-tetrahydrodecyl, perfluoro-1H,1H,2H,2H-dodecyl, perfluoro-1H,1H,2H,2H-tetradecyl, pentafluorophenyl, or 4-fluorophenyl.

It is a further object of the present invention to provide the above-described varnish comprising a polymer obtained by reacting a silsesquioxane derivative represented by the formula (1-4) with a silsesquioxane derivative represented by the formula (9-1), wherein $R^8$ represents a benzenetriyl or trifluorobenzenetriyl.

It is a further object of the present invention to provide the above-described varnish comprising a polymer obtained by reacting a silsesquioxane derivative represented by the formula (1-4) with a silsesquioxane derivative represented by the formula (9-1), wherein R is an unsubstituted phenyl.

It is a further object of the present invention to provide the above-described varnish comprising a polymer obtained by reacting a silsesquioxane derivative represented by the formula (1-4) with a silsesquioxane derivative represented by the formula (9-1), wherein R is an unsubstituted phenyl and $R^6$ independently represents a fluoroalkyl or fluoroaryl.

It is a further object of the present invention to provide the above-described varnish comprising a polymer obtained by reacting a silsesquioxane derivative represented by the formula (1-4) with a silsesquioxane derivative represented by the formula (9-1), wherein R is an unsubstituted phenyl, and $R^6$ independently represents trifluoromethyl, 3,3,3-trifluoropropyl, 3,3,4,4,5,5,6,6,6-nonafluorohexyl, tridecafluoro-1,1,2,2-tetrahydrooctyl, heptadecafluoro-1,1,2,2-tetrahydrodecyl, perfluoro-1H,1H,2H,2H-dodecyl, perfluoro-1H,1H,2H,2H-tetradecyl, pentafluorophenyl, or 4-fluorophenyl.

It is a further object of the present invention to provide the above-described varnish comprising a polymer obtained by reacting a silsesquioxane derivative represented by the formula (1-4) with a silsesquioxane derivative represented by the formula (9-1), wherein R is an unsubstituted phenyl and $R^8$ represents a benzenetriyl or trifluorobenzenetriyl.

It is a further object of the present invention to provide a liquid crystal display element, which comprise an alignment layer formed by using the above-described varnish.

Hereinafter, the "silsesquioxane" may be represented as "PSQ". Therefore, the "silsesquioxane derivative" may be represented as "PSQ derivative". The PSQ derivative represented by the formula (1-1) may be represented as "compound (1-1)". The compound represented by the formula (2-1) may be represented as "compound (2-1)". PSQ derivatives and compounds represented by other formulae may be represented in the same manner. When multiple groups represented by the same symbol are present in a formula representing a compound, the groups may be identical to or different from each other as long as they are selected from the defined groups. For example, in the formula (1-1), R independently represents a group selected from unsubstituted phenyl, cyclopentyl, cyclohexyl, and t-butyl, and may be identical to or different from each other. The same holds true for the other formulae.

DETAILED DESCRIPTION OF EXEMPLARY EMBODIMENTS

Hereinafter, the present invention will be described in more detail.

In the present invention, "alkyl" may be a linear one or branched one in any case. Furthermore, part or entirety of the alkyl may be cyclic.

Specific examples of a divalent organic group include methylene, ethanediyl, propanediyl, butanediyl, pentanediyl, hexanediyl, heptanediyl, cyclobutanediyl, cyclopentanediyl, cyclohexanediyl, and benzenediyl (phenylene).

The examples of a divalent organic group include divalent groups whose hydrogen atoms are replaced by fluorine such as difluoromethylene, tetrafluoroethanediyl, hexafluoropropanediyl, octafluorobutanediyl, perfluoropentanediyl, perfluorohexanediyl, perfluoroheptanediyl, hexafluorocyclobutanediyl, perfluorocyclopentanediyl, perfluorocyclohexanediyl, and fluorobenzenediyl (fluorophenylene).

The position of a bonding group in any one of those organic groups is optional. For example, ethanediyl may be 1,2-ethanediyl or a 1,1-ethanediyl group. Benzenediyl may be 1,4-benzenediyl, 1,3-benzenediyl, or 1,2-benzenediyl. Optional —$CH_2$— of any one of those hydrocarbons may be replaced by —O—, ester bond, amide bond, or carbonyl. In such cases, two or more consecutive oxygen are not preferable because such a structure is chemically unstable.

When the compound (1-1) is used, a polymer can be obtained by hydrosilylation reaction using a compound having at least two Si—H groups as a counterpart. In order to obtain a polymer having a linear chemical structure, a compound having two Si—H groups is preferably used as a counterpart of the reaction with the compound (1-1). The selection of a silsesquioxane derivative or a compound having siloxane as a counterpart compound can provide a polymer excellent in heat resistance, weatherability.

According to the first aspect of the present invention, there is provided a polymer for a varnish for forming a liquid crystal alignment layer which is obtained by reacting a silsesquioxane derivative represented by the formula (1-1) with at least one of the compounds selected from the group consisting of a compound represented by the formula (2-1), a compound represented by the formula (3-1), a compound represented by the formula (4-1), a compound represented by the formula (5-1), a compound represented by the formula (6-1), and a compound represented by the formula (7-1). A polymer (polymer 1) can be obtained by subjecting those compounds to hydrosilylation polymerization using an appropriate solvent and catalyst.

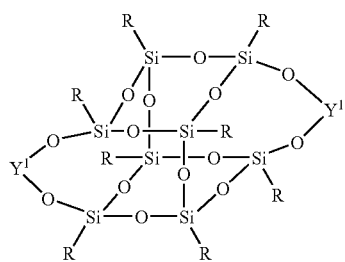
(1-1)

In the formula (1-1), R independently represents an unsubstituted phenyl, cyclopentyl, cyclohexyl, or t-butyl, and particularly preferably represents an unsubstituted phenyl, and $Y^1$ independently represents a group represented by the formula (a-1)

(a-1)

In the formula (a-1), $R^a$ represents a vinyl, allyl, or styryl, and $X^{11}$ represents an alkyl having 1 to 4 carbon atoms or an unsubstituted phenyl.

The compound (1-1) used in the present invention can be produced by the method as described in WO 03/024870.

Specific examples of the compound (1-1) include, but not limited to, the compounds shown in Synthesis Examples 1 and 2 to be described later.

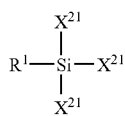
(2-1)

In the formula (2-1), $R^1$ represents an alkyl having 1 to 4 carbon atoms or unsubstituted phenyl, at least two of $X^{21}$ is hydrogen, and the remaining $X^{21}$ is $R^1$.

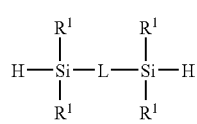
(3-1)

In the formula (3-1), $R^1$ independently represents an alkyl having 1 to 4 carbon atoms or unsubstituted phenyl, and L represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene, or a group represented by the following formula (c).

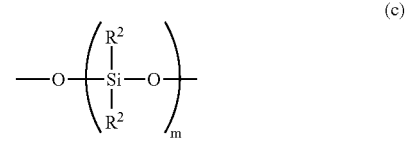
(c)

In the formula (c), $R^2$ independently represents a group defined in the same manner as $R^1$, and "m" represents an integer of 1 to 30.

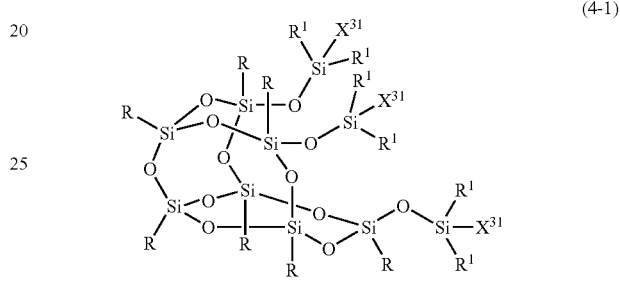
(4-1)

In the formula (4-1), R independently represents an unsubstituted phenyl, cyclopentyl, cyclohexyl, t-butyl, iso-butyl, or trifluoropropyl, $R^1$ independently represents an alkyl having 1 to 4 carbon atoms or an unsubstituted phenyl, and at least two of $X^{31}$ is hydrogen, and the remaining $X^{31}$ is $R^1$.

The compound (4-1) can be produced according to the method as described in JP2005-015738A.

Specific examples of the compound (4-1) include, but not limited to, the compounds shown in Synthesis Examples 1 and 2 to be described later.

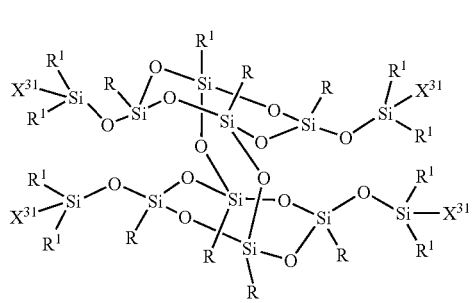
(5-1)

In the formula (5-1), R independently represents an unsubstituted phenyl, cyclopentyl, cyclohexyl, or t-butyl, $R^1$ independently represents an alkyl having 1 to 4 carbon atoms or unsubstituted phenyl, at least two of $X^{31}$ is hydrogen, and the remaining $X^{31}$ is $R^1$.

The compound (5-1) can be produced according to the method as described in WO 2004/024741.

Specific examples of the compound (5-1) include, but not limited to, the compound shown in Synthesis Example 1 to be described later.

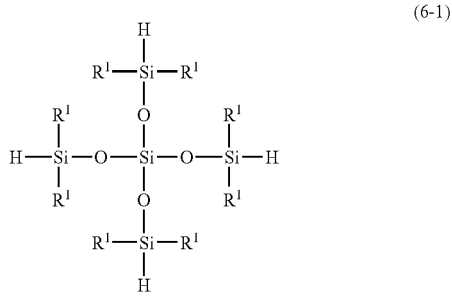

(6-1)

In the formula (6-1), $R^1$ independently represents an alkyl having 1 to 4 carbon atoms or unsubstituted phenyl.

Specific examples of the compound (6-1) include, but not limited to, the compound shown in Synthesis Example 2 to be described later.

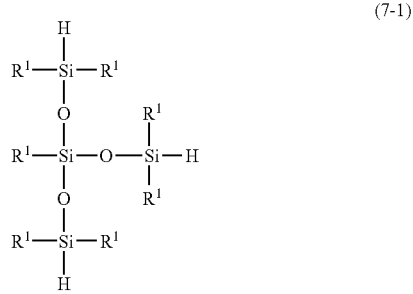

(7-1)

In the formula (7-1), $R^1$ independently represents an alkyl having 1 to 4 carbon atoms or unsubstituted phenyl.

The above-described compounds are available from Hybrid Plastics.

A solvent to be used for the hydrosilylation polymerization is not particularly limited as long as it does not inhibit the progress of the reaction. Examples of a preferable solvent include: hydrocarbon-based solvents such as hexane and heptane; aromatic hydrocarbon-based solvents such as benzene, toluene, and xylene; ether-based solvents such as diethyl ether, tetrahydrofuran (THF), and dioxane; halogenated hydrocarbon-based solvents such as methylene chloride and carbon tetrachloride; and ester-based solvents such as ethyl acetate. Each of those solvents may be used alone, or two or more of them may be used in combination. Of those solvents, aromatic hydrocarbon-based solvents are preferable, and toluene is more preferable. Although a solvent is not necessarily used, if used, a ratio of the compound of the present invention is preferably 0.05 to 80 wt %, or more preferably 30 to 70 wt % with respect to the weight of the solvent. The ratio varies depending on a purpose.

The hydrosilylation polymerization may be performed at room temperature. Alternatively, the polymerization may be performed under heating for promoting the polymerization. Furthermore, the polymerization may be performed under cooling for suppressing heat generation due to the polymerization or unpreferable polymerization.

A catalyst can be used as required in the hydrosilylation polymerization. The addition of a hydrosilylation catalyst allows the polymerization to progress at an improved rate. Examples of a preferable hydrosilylation catalyst include Karstedt catalyst, Spier catalyst, and hexachloroplatinic acid.

Those are well known catalysts. Such hydrosilylation catalysts have high reactivity, and the addition of a small amount of such a hydrosilylation catalyst allows the reaction to progress sufficiently. Each of those hydrosilylation catalysts is used in such amount that a ratio of a transition metal in the catalyst to a hydrosilyl group is $10^{-9}$ to 1 mol %. The catalyst is preferably added in such an amount that the ratio is $10^{-7}$ to $10^{-3}$ mol %. The ratio of $10^{-9}$ mol % is the lower limit necessary for enabling the reaction to progress and for completing the reaction within a reasonable time period. On the other hand, the ratio is preferably 1 mol % or less in consideration of a reduction in production cost.

The molecular weight of a polymer obtained by the hydrosilylation polymerization is preferably 3,000 to 200,000. A polymer having a molecular weight of less than 3,000 is hardly soluble in a solvent, while a polymer having a molecular weight of more than 200,000 is apt to become gel form. Therefore, the molecular weight is more preferably 3,000 to 20,000. Two or more kinds of polymers having different molecular weights may be used as a mixture in an application solution in the present invention.

According to the second aspect of the present invention, there is provided a polymer for a varnish for forming a liquid crystal alignment layer obtained by reacting a silsesquioxane derivative represented by the formula (1-2) with a compound represented by the formula (8-2). A polymer (polymer 2) can be obtained by subjecting those monomers to dehydration condensation reaction using an appropriate solvent and catalyst.

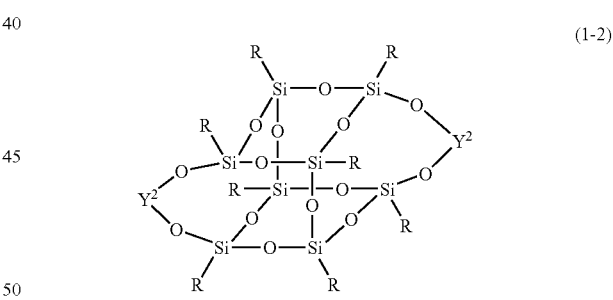

(1-2)

In formula (1-2), R independently represents unsubstituted phenyl, cyclopentyl, cyclohexyl, or t-butyl, particularly preferably represents an unsubstituted phenyl, and $Y^2$ represents a group represented by the formula (a-2).

(a-2)

In the formula (a-2), $X^{12}$ represents an alkyl having 1 to 4 carbon atoms or an unsubstituted phenyl.

The compound (1-2) can be produced according to the method as described in WO 03/024870 (US 2004-249103).

Specific examples of the compound (1-2) include, but not limited to, the compound shown in Synthesis Example 4 to be described later.

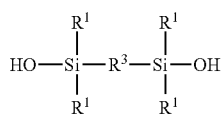

(8-2)

In the formula (8-2), $R^1$ represents an alkyl or unsubstituted phenyl and $R^3$ represents a phenyl, naphthalene, or anthracene.

A specific example of the compound (8-2) includes, but not limited to, 1,4-bis(hydroxydimethylsilyl)benzene as shown in Synthesis Example 4 to be described later.

An ether-based solvent such as diethyl ether or diisopropyl ether or an ester-based solvent such as ethyl acetate, propyl acetate, or butyl acetate, which readily dissolves the compound (1-2) and the compound (8-2), and a hydrocarbon-based solvent such as hexane or heptane, an aromatic hydrocarbon-based solvent such as benzene, toluene, or xylene, or a halogenated hydrocarbon-based solvent such as methylene chloride or carbon tetrachloride, which readily dissolves a produced polymer are preferably mixed and used as a solvent to be used for the dehydration condensation reaction. However, a combination of solvents is not limited to the above-mentioned solvents as long as both the compounds and the produced polymer can be dissolved. A ratio of the compound of the present invention is preferably 1 wt % to 80 wt %, or more preferably 20 wt % to 50 wt % with respect to the weight of the solvent.

Examples of a catalyst to be used for the dehydration condensation reaction include: amines such as triethylamine, tributylamine, di-iso-propylamine, N,N-diethylhexylamine, 1,4-diazabicyclo[2.2.2]octane, 1,8-diazabicyclo[5.4.0]undeca-7-ene, and 2,5-diazabicyclo[2.2.1]heptane; and tetramethylguanidium-2-ethylhexoate. A concentration of the catalyst is 0.01 to 10.0%, or preferably 0.1 to 1.0% with respect to monomers.

The dehydration condensation reaction can be performed by azeotropic dehydration.

The compound (1-2) is preferably reacted with the compound (8-2) at such molar ratio that the compound (1-2) accounts for 10 to 80 mol %, more preferably 50 to 75 mol % with respect to the total amount of the both compounds.

The molecular weight of a polymer obtained by the dehydration condensation reaction is preferably 3,000 to 1,000,000.

According to the third aspect of the present invention, there is provided a polymer for a varnish for forming a liquid crystal alignment layer obtained by reacting a silsesquioxane derivative represented by the formula (1-3) with a carboxylic acid or an epoxide. A polymer (polymer 3) can be obtained by reacting the silsesquioxane derivative represented by the formula (1-3) with one or more kinds of a carboxylic acid or an epoxide in an appropriate organic solvent.

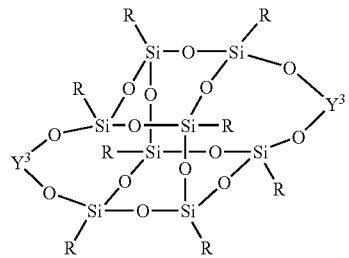

(1-3)

In the formula (1-3), R independently represents an unsubstituted phenyl, cyclopentyl, cyclohexyl, or t-butyl, particularly preferably represents an unsubstituted phenyl, and $Y^3$ represents a group represented by the formula (a-3).

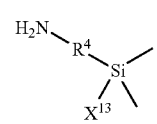

(a-3)

In the formula (a-3), $R^4$ represents a divalent organic group having 1 to 20 carbon atoms, and $X^{13}$ represents an alkyl having 1 to 4 carbon atoms or unsubstituted phenyl.

The compound (1-3) can be produced according to the method as described in WO 03/024870.

Specific examples of the compound (1-3) include, but not limited to, the compound shown in Synthesis Example 3 to be described later.

The carboxylic acid to be used is a polyvalent carboxylic acid selected from tetracarboxylic acids and dicarboxylic acids. The term "tetracarboxylic acid" is used as a generic name including esters, anhydrides, and halides of tetracarboxylic acids as well as tetracarboxylic acids. The term "dicarboxylic acid" is defined in the same manner.

The tetracarboxylic acid may be aliphatic, alicyclic, or aromatic. Each of those acids may have a siloxane group, or may be optically active. Some tetracarboxylic dianhydrides have isomers, and a mixture containing the isomers is also available. Two or more tetracarboxylic dianhydrides may be used together. When two or more tetracarboxylic dianhydrides are used, two or more tetracarboxylic dianhydrides may be selected from one kind, or from different kinds. Examples of the tetracarboxylic dianhydride to be used in the present invention are shown below. However, the tetracarboxylic dianhydride is not limited to the following examples.

Examples of an aliphatic tetracarboxylic dianhydride include ethane tetracarboxylic dianhydride and butane tetracarboxylic dianhydride.

Examples of the alicyclic tetracarboxylic dianhydride include: cyclobutane tetracarboxylic dianhydride; cyclopentane tetracarboxylic dianhydride; bicycloheptane tetracarboxylic dianhydride; bicyclooctane tetracarboxylic dianhydride; bicyclo[2.2.2]-octo-7-ene-2,3,5,6-tetracarboxylic dianhydride; cyclohexane-1,2,5,6-tetracarboxylic dianhydride; 3,4-dicarboxy-1,2,3,4-tetrahydronaphthalene-1-succinic dianhydride; 3,3'-bicyclohexyl-1,1',2,2'-tetracarboxylic dianhydride; 2,3,5-tricarboxycyclohexylpentylacetic dianhydride; 5-(2,5-dioxotetrahydrofural)-3-methyl-3-cyclohexene-1,2-dicarboxylic dianhydride; 1,3,3a,4,5,9b-hexahydro-5-tetrahydro-2,5-dioxo-3-furanyl)naphtho[1,2-c]-furane-1, 3-dione; 3,5,6-tricarboxynorbornane-2-acetic dianhydride;

2,3,4,5-tetrahydrofurantetracarboxylic dianhydride; and tetracyclo[6.2.11,3.02,7]-dodecane-4,5,9,10-tetracarboxylic dianhydride. Furthermore, acid dianhydride as shown below can also be used. Optional hydrogen in each of these compounds may be replaced by a lower alkyl such as methyl or ethyl.

Examples of an aromatic tetracarboxylic dianhydride include: pyromellitic dianhydride; 3,3',4,4'-benzophenonetetracarboxylic dianhydride; naphthalenic dianhydride (such as 2,3,6,7-naphthalenic anhydride); 3,3',4,4'-diphenylmethanetetracarboxylic dianhydride; 3,3'-4,4'-diphenylethanetetracarboxylic dianhydride; 3,3',4,4'-diphenylpropanetetracarboxylic dianhydride; 3,3'-4,4'-diphenylsulfonetetracarboxylic dianhydride; 3,3',4,4'-diphenylethertetracarboxylic dianhydride; 3,3',4,4'-dimethyldiphenylsilanetetracarboxylic dianhydride; 4,4'-bis(3,4-dicarboxyphenoxy)diphenylsulfide dianhydride; 4,4'-bis(3,4-dicarboxyphenoxy)diphenylsulfone dianhydride; 4,4'-bis(3,4-dicarboxyphenylmethyl)diphenylmethane dianhydride; 4,4'-bis(3,4-dicarboxyphenylmethyl)diphenylethane dianhydride; 4,4'-bis(3,4-dicarboxylphenylmethyl)diphenylpropane dianhydride; 4,4'-bis(3,4-dicarboxyphenoxy)diphenylmethane dianhydride; 4,4'-bis(3,4-dicarboxyphenoxy)diphenylethane dianhydride; 4,4'-bis(3,4-dicarboxyphenoxy)diphenylpropane dianhydride; 3,3',4,4'-perfluoropropylidenediphthalic dianhydride; 3,3',4,4'-biphenyltetracarboxylic dianhydride; bis(phthalic acid)phenylsulfinoxide dianhydride; p-phenylene-bis(triphenylphthalic acid) dianhydride; m-phenylene-bis(triphenylphthalic acid) dianhydride; bis(triphenylphthalic acid)-4,4'-diphenylether dianhydride; and bis(triphenylphthalic acid)-4,4'diphenylmethane dianhydride.

The dicarboxylic acid may be aliphatic, alicyclic, or aromatic. Each of those acids may have a siloxane group, or may be optically active. Some dicarboxylic acids have isomers, and a mixture containing the isomers is also available. Two or more dicarboxylic acids may be used together. When two or more dicarboxylic acids are used, two or more dicarboxylic acids may be selected from one kind, or from different kinds. Examples of the dicarboxylic acid to be used in the present invention are shown below. However, the dicarboxylic acid is not limited to the following examples.

Examples of an aliphatic dicarboxylic acid include malonic acid, oxalic acid, dimethylmalonic acid, succinic acid, fumaric acid, glutaric acid, adipic acid, muconic acid, 2-methyladipic acid, trimethyladipic acid, pimelic acid, 2,2-dimethylglutaric acid, 3,3-diethylsuccinic acid, azelaic acid, sebacic acid, and suberic acid.

Examples of an alicyclic dicarboxylic acid include: 1,1-cyclopropanedicarboxylic acid; 1,2-cyclopropanedicarboxylic acid; 1,1-cyclobutanedicarboxylic acid; 1,2-cyclobutanedicarboxylic acid; 1,3-cyclobutanedicarboxylic acid; 3,4-diphenyl-1,2-cyclobutanedicarboxylic acid; 2,4-diphenyl-1,3-cyclobutanedicarboxylic acid; 1-cyclobutene-1,2-dicarboxylic acid; 1-cyclobutene-3,4-dicarboxylic acid; 1,1-cyclopentanedicarboxylic acid; 1,2-cyclopentanedicarboxylic acid; 1,3-cyclopenetanedicarboxylic acid; 1,1-cyclohexanedicarboxylic acid; 1,2-cyclohexanedicarboxylic acid; 1,3-cyclohexanedicarboxylic acid; 1,4-cyclohexanedicarboxylic acid; 1,4-(2-norbornene)dicarboxylic acid; norbornene-2,3-dicarboxylic acid; bicyclo[2.2.2]octane-1,4-dicarboxylic acid; bicyclo[2.2.2]octane-2,3-dicarboxylic acid; 2,5-dioxo-1,4-bicyclo[2.2.2]octanedicarboxylic acid; 1,3-adamantanedicarboxylic acid; 4,8-dioxo-1,3-adamantanedicarboxylic acid; 2,6-spiro[3.3]heptanedicarboxylic acid; 1,3-adamantanediacetic acid; and camphor acid.

Examples of an aromatic dicarboxylic acid include: o-phthalic acid; isophthalic acid; terephthalic acid; 5-methylisophthalic acid; 5-tert-butylisophthalic acid; 5-aminoisophthalic acid; 5-hydroxyisophthalic acid; 2,5-dimethylterephthalic acid; tetramethylterephthalic acid; 1,4-naphthalenedicarboxylic acid; 2,5-napthalenedicarboxylic acid; 2,6-naphthalenedicarboxylic acid; 2,7-naphthalenedicarboxylic acid; 1,4-anthracenedicarboxylic acid; 1,4-anthraquinonedicarboxylic acid; 2,5-biphenyldicarboxylic acid; 4,4'-biphenyldicarboxylic acid; 1,5-biphenylenedicarboxylic acid; 4,4"-tert-phenyldicarboxylic acid; 4,4'-diphenylmethanedicarboxylic acid; 4,4'-diphenylethanedicarboxylic acid; 4,4'-diphenylpropanedicarboxylic acid; 4,4'-diphenylhexafluoropropanedicarboxylic acid; 4,4'-diphenylether dicarboxylic acid; 4,4'-bibenzyldicarboxylic acid; 4,4'-stilbenedicarboxylic acid; 4,4'-trandicarboxylic acid; 4,4'-carbonyldibenzoic acid; 4,4'-sulfonyldibenzocid acid; 4,4'-dithiodibenzoic acid; p-phenylenediacetic acid; 3,3'-p-phenylenedipropionic acid; 4-carboxycinnamic acid; p-phenylenediacrylic acid; 3,3'-(4,4'-(methylenedi-p-phenylene))dipropionic acid; 4,4'-(4,4'-(oxydi-p-phenylene))dipropionic acid; 4,4'-(4,4'-(oxydi-p-phenylene))dibutyric acid; (isopropylidenedi-p-phenylenedioxy)dibutyric acid; and bis(p-carboxyphenyl)dimethylsilane.

Examples of a dicarboxylic acid having a heterocyclic ring include: 1,5-(9-oxofluorene)dicarboxylic acid; 3,4-furandicarboxylic acid; 4,5-thiazoledicarboxylic acid; 2-phenyl-4,5-thiazoledicarboxylic acid; 1,2,5-thiadiazole-3,4-dicarboxylic acid; 1,2,5-oxadiazole-3,4-dicarboxylic acid; 2,3-pyridinedicarboxylic acid; 2,4-pyridinedicarboxylic acid; 2,5-pyridinedicarboxylic acid; 2,6-pyridinedicarboxylic acid; 3,4-pyridinedicarboxylic acid; and 3,5-pyridinedicarboxylic acid.

The epoxide may be aliphatic, alicyclic, or aromatic. Each of those epoxides may have a siloxane group, or may be optically active. Some epoxides have isomers, and a mixture containing the isomers is also available. Two or more epoxides may be used together. When two or more epoxides are used, two or more epoxides may be selected from one kind, or from different kinds.

According to the fourth aspect of the present invention, there is provided a polymer for a varnish for forming a liquid crystal alignment layer obtained by reacting a silsesquioxane derivative represented by the formula (1-4) and a diamine. A polymer (polymer 4) can be obtained by reacting the compound (1-4) with the diamine in an appropriate organic solvent.

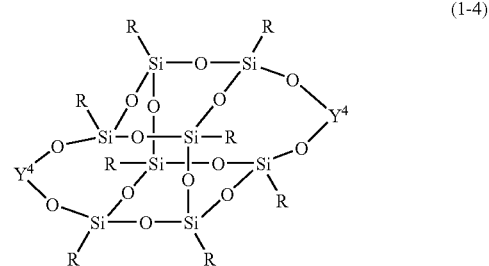

(1-4)

In the formula (1-4), R independently represents an unsubstituted phenyl, cyclopentyl, cyclohexyl, or t-butyl, particularly preferably represents an unsubstituted phenyl, and $Y^4$ represents a group represented by the formula (a-4) or (b-1).

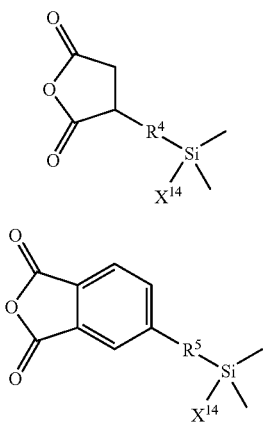

In the formula (a-4), $R^4$ represents a divalent organic group having 1 to 20 carbon atoms, and $X^{14}$ represents an alkyl having 1 to 4 carbon atoms or unsubstituted phenyl.

In the formula (b-1), $R^5$ represents a single bond or a divalent organic group having 1 to 20 carbon atoms.

The compound (1-4) can be produced according to the method as described in WO 03/024870.

Specific examples of the compound (1-4) include, but not limited to, the compounds shown in Synthesis Examples 3 and 5 to be described later.

The diamines may be aliphatic, alicyclic, or aromatic. Each of those diamines may have a siloxane group, or may be optically active.

Examples of the aliphatic diamine include ethylenediamine, trimethylenediamine, tetramethylenediamine, pentamethylenediamine, and hexamethylenediamine. A diamine having a structure obtained by replacing optional —CH$_2$— in any one of those alkylenediamines by —O— is also available. Some diamines have isomers, and a mixture containing the isomers is also available. Two or more diamines may be used together. When two or more diamines are used, two or more diamines may be selected from one kind, or from different kinds.

Examples of an alicyclic diamine include: 1,4-diaminodicyclohexane; 1,3-bis(aminomethyl)cyclohexane; 1,4-bis(aminomethyl)cyclohexane; 4,4'-diaminodicyclohexylmethane; bis(2-methyl-4-aminocyclohexyl)methane; isophoronediamine; 2,5-bis(aminomethyl)-bicyclo[2.2.1]heptane; 2,6-bis(aminomethyl)-bicyclo[2.2.1]heptane; 2,3-diaminobicyclo[2.2.1]heptane; 2,5-diaminobicyclo[2.2.1]heptane; 2,6-diaminobicyclo[2.2.1]heptane; 2,7-diaminobicyclo[2.2.1]heptane; 2,3-diamino-7-azabicyclo[2.2.1]heptane; 2,5-diamino-7-azabicyclo[2.2.1]heptane; 2,6-diamino-7-azabicyclo[2.2.1]heptane; 2,3-diamino-7-thiabicyclo[2.2.1]heptane; 2,5-diamino-7-thiabicyclo[2.2.1]heptane; 2,6-diamino-7-thiabicyclo[2.2.1]heptane; 2,3-diaminobicyclo[2.2.2]octane; 2,5-diaminobicyclo[2.2.2]octane; 2,6-diaminobicyclo[2.2.2]octane; 2,5-diaminobicyclo[2.2.2]octan-7-ene; 2,5-diamino-7-azabicyclo[2.2.2]octane; 2,5-diamino-7-oxabicyclo[2.2.2]octane; 2,5-diamino-7-thiabicyclo[2.2.2]octane; 2,6-diaminobicyclo[3.2.1]octane; 2,6-diaminoazabicyclo[3.2.1]octane; 2,6-diaminooxabicyclo[3.2.1]octane; 2,6-diaminothiabicyclo[3.2.1]octane; 2,6-diaminobicyclo[3.2.2]nonane; 2,6-diaminobicyclo[3.2.2]nonan-8-ene; 2,6-diamino-8-azabicyclo[3.2.2]nonane; 2,6-diamino-8-oxabicyclo[3.2.2]nonane; and 2,6-diamino-8-thiabicyclo[3.2.2]nonane.

Examples of an aromatic diamine include: 2,2-bis(4-aminophenyl)propane; 2,6-diaminopyridine; bis-(4-aminophenyl)diethylsilane; bis-(4-aminophenyl)diphenylsilane; bis-(4-aminophenyl)ethylphosphineoxide; bis-(4-aminophenyl)-N-butylamine; N,N-bis-(4-aminophenyl)-N-methylamine; N-(3-aminophenyl)-4-aminobenzamide; 3,3'-diaminodiphenylmethane; 3,3'-diaminodiphenylether; 3,3'-diaminodiphenylsulfone; 2,2-bis(3-aminophenyl)propane; 1,3-bis(3-aminophenyl)propane; 3,3'-diaminodiphenylsulfide; 2,3,5,6-tetramethyl-p-phenylenediamine; 2,5-dimethyl-p-phenylenediamine; p-xylenediamine; m-xylenediamine; p-xylylenediamine; m-xylylenediamine; 2,4-diaminotoluene; 2,6-diaminotoluene; 1,2-bis(3-diaminophenyl)ethane; 1,1-bis(3-diaminophenyl)ethane; 4,4'-diaminodiphenylhexafluoropropane; 2,2-bis(4-aminophenyl)hexafluoropropane; 4,4'-diaminobenzophenone; 4,4'-diaminodiphenylsulfide; 4,4'-diaminodiphenylsulfone; 4,4'-diaminodiphenylether; 3,4'-diaminodiphenylether; 1,5-diaminonaphthalene; 2,6-diaminonaphthalene; bis(4-(4-aminophenoxy)phenyl)methane; 1,1-bis(4-(4-aminophenoxy)phenyl)ethane; 1,2-bis(4-(4-aminophenoxy)phenyl)ethane; 1,1-bis[4-(4-aminophenoxy)phenyl]propane; 2,2-bis[4-(4-aminophenoxy)phenyl]propane; 2,2-bis(4-(4-aminophenoxy)phenyl)butane; 4,4'-bis(4-aminophenoxy)diphenylketone; bis(4-(4-aminophenoxy)phenyl)sulfone; bis(4-(4-aminophenoxy)phenyl)sulfide; 1,3-bis(4-(4-aminophenoxy)phenyl)benzene; 1,4-bis(4-(4-aminophenoxy)phenyl)benzene; 4,4'-bis(4-(4-aminophenoxy)phenyl)biphenyl; 1,2-bis(4-(4-aminophenoxy)phenyl)cyclohexane; 1,3-bis(4-(4-aminophenoxy)phenyl)cyclohexane; 1,4-bis(4-(4-aminophenoxy)phenyl)cyclohexane; bis(4-(4-aminophenoxy)phenyl)hexafluoropropane; 2,2-bis(4-(2-aminophenoxy)phenyl)hexafluoropropane; 2,2-bis(4-(3-aminophenoxy)phenyl)hexafluoropropane; 2,2-bis(4-(3-carbamoyl-4-aminophenoxy)phenyl)hexafluoropropane; 2,2-bis-(3-sulfamoyl-4-aminophenyl)hexafluoropropane; 2,2-bis-(3-carboxy-4-aminophenyl)hexafluoropropane; 2,2-bis(4-(3-sulfamoyl-4-aminophenoxy)phenyl)hexafluoropropane; 2,2-bis(4-(3-carboxy-4-aminophenoxy)phenyl)hexafluoropropane; 1,3-bis(2,2-{4-(4-aminophenoxy)phenyl}hexafluoroisopropyl)benzene; 2,4-bis(β-amino-t-butyl)toluene; bis(p-β-methyl-γ-aminopentyl)benzene; bis(p-(1,1-dimethyl-5-aminopentyl)benzene; bis(p-β-amino-t-butylphenyl)ether; bis(4-aminobenzyloxy)methane; bis(4-aminobenzyloxy)ethane; bis(4-aminobenzyloxy)propane; bis(4-aminobenzyloxy)cyclohexane; p-phenylenediamine; m-phenylenediamine; o-phenylenediamine; 4,4'-diaminobiphenyl; 4,4'-diaminodiphenylmethane; 4,4'-diaminodiphenylethane; 4,4'-diaminobiphenyl; 3,3'-dimethylbenzidine; 1,3-bis(4-aminophenyl)propane; 2,2-bis(4-aminophenyl)propane; bis(4-amino-3-methylphenyl)methane; bis(4-amino-2-methylphenyl)methane; 1,2-bis(4-amino-3-methylphenyl)ethane; 1,3-bis(4-amino-3-methylphenyl)propane; 1,2-bis(4-amino-2-methylphenyl)ethane; 1,3-bis(4-amino-2-methylphenyl)propane; 1,4-bis(4-aminophenyl)benzene; 1,4-bis((4-aminophenyl)methyl)benzene; 1,4-bis((3-aminophenyl)methyl)benzene; 1,4-bis((4-aminophenyl)ethyl)

benzene; 1,4-bis((3-aminophenyl)ethyl)benzene; 1,4-bis((4-amino-3-methyl-phenyl)methyl)benzene; 1,4-bis((4-amino-3-methyl-phenyl)ethyl)benzene; 4,4'-(4-aminophenyl)biphenyl; bis-((4-(4-aminophenylmethyl)phenyl)methane; bis-((4-(4-aminophenylmethyl)phenyl)ethane; bis-((4-(3-aminophenylmethyl)phenyl)methane; bis-((4-(3-aminophenylmethyl)phenyl)ethane; 2,2-bis-((4-(4-aminophenylmethyl)phenyl)propane; and 2,2-bis-((4-(3-aminophenylmethyl)phenyl)propane.

According to the fifth aspect of the present invention, there is provided a polymer for a varnish for forming a liquid crystal alignment layer obtained by reacting a silsesquioxane derivative represented by the formula (1-3) with a silsesquioxane derivative represented by the formula (1-4). A polymer (polymer 5) can be obtained by reacting the compound (1-3) with the compound (1-4) in an appropriate organic solvent.

According to the sixth aspect of the present invention, there is provided a polymer for a varnish for forming a liquid crystal alignment layer obtained by reacting a silsesquioxane derivative represented by the formula (1-4) and a silsesquioxane derivative represented by the formula (1-5). A polymer (polymer 6) can be obtained by reacting the compound (1-4) with the compound (1-5) in an appropriate organic solvent.

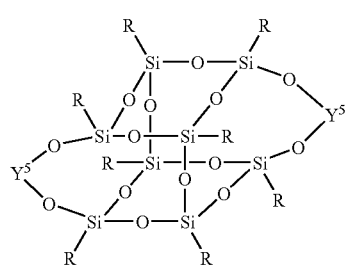

(1-5)

In the formula (1-5), R independently represents an unsubstituted phenyl, cyclopentyl, cyclohexyl, or t-butyl, particularly preferably represents an unsubstituted phenyl, and $Y^5$ represents a group represented by the formula (a-5).

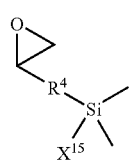

(a-5)

In the formula (a-5), $R^4$ represents a divalent organic group having 1 to 20 carbon atoms, and $X^{15}$ represents an alkyl having 1 to 4 carbon atoms or unsubstituted phenyl.

The compound (1-5) can be produced according to the method as described in the WO 03/024870.

Specific examples of the compound (1-5) include, but not limited to, the compound shown in Synthesis Example 5 to be described later.

According to the seventh aspect of the present invention, there is provided a polymer for a varnish for forming a liquid crystal alignment layer obtained by reacting a silsesquioxane derivative represented by the formula (1-4) with a silsesquioxane derivative represented by the formula (9-1). A polymer (polymer 7) can be obtained by reacting the compound (1-4) with the compound (9-1) in an appropriate organic solvent.

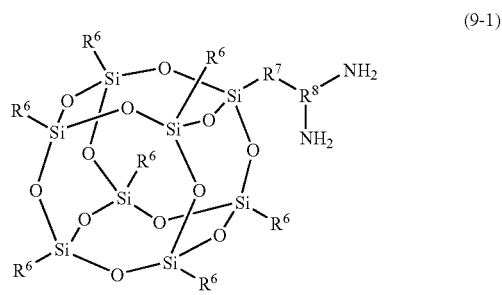

(9-1)

In the formula (9-1), $R^6$ independently represents an alkyl having 1 to 20 carbon atoms, alkenyl having 2 to 20 carbon atoms, or aryl having 6 to 20 carbon atoms. In $R_5$, optional —$CH_2$— may be replaced by oxygen. Furthermore, optional hydrogen may be replaced by halogen. A fluoroalkyl or fluoroaryl is preferable, and any one of trifluoromethyl, 3,3,3-trifluoropropyl, 3,3,4,4,5,5,6,6,6-nonafluorohexyl, tridecafluoro-1,1,2,2-tetrahydrooctyl, heptadecafluoro-1,1,2,2-tetrahydrodecyl, perfluoro-1H,1H,2H,2H-dodecyl, perfluoro-1H,1H,2H,2H-tetradecyl, pentafluorophenyl, and 4-fluorophenyl groups is more preferable.

$R^7$ represents a single bond or a divalent organic group having 1 to 15 carbon atoms.

$R^8$ represents a trivalent organic group having 1 to 15 carbon atoms, or preferably represents a benzenetriyl or trifluorobenzenetriyl group.

The compound of the formula (9-1) can be easily synthesized according to a conventional organic chemistry approach. For example, a method comprising circularizing the commercially available incompletely condensed silsesquioxane derivative (a) with a trichlorosilane derivative having an appropriate functional group; reacting the obtained compound (b) with an optional organic group having two functional groups which can be converted to an amino group, such as a nitro group; and converting the functional group in the resultant compound (c) to an amino group. A synthesis example of the compound (9-1) in which $R^7$ is an ester bond is shown below.

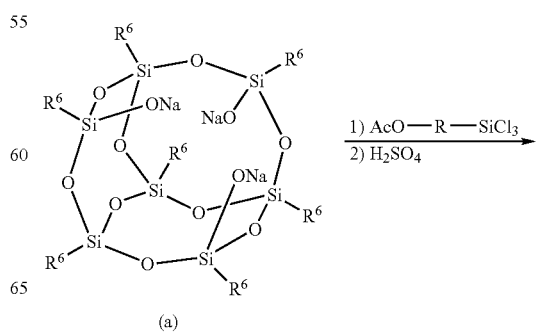

(a)

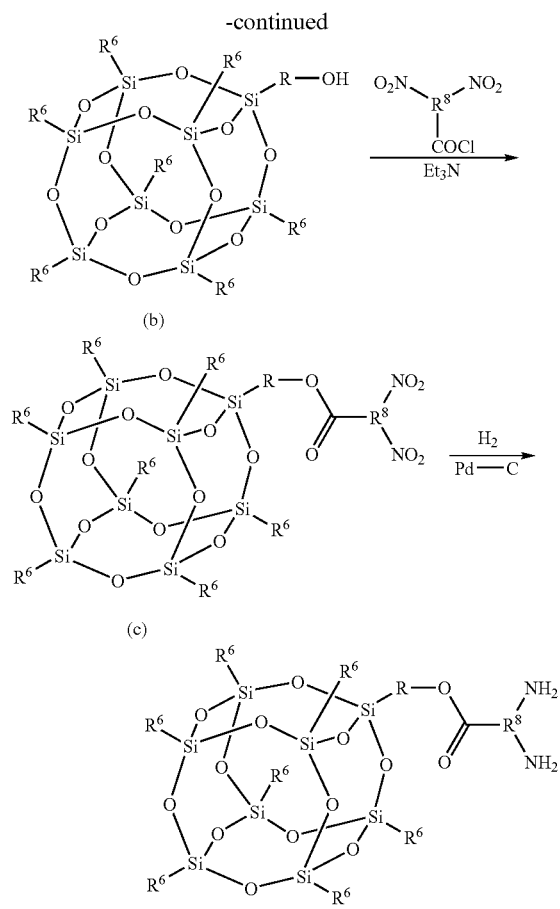

In this scheme, $R^6$ and $R^8$ respectively represent the group as defined above, and R represents an organic group having 1-14 carbon atoms.

Solvents to be used in the reactions for synthesizing the Polymers 3 to 7 are not particularly limited as long as each of them does not inhibit the progress of a polymerization reaction and can dissolve the monomers and the polymer. Specific examples of the solvents include: toluene; xylene; mesitylene; cyclopentanone; cyclohexanone; N-methyl-2-pyrrolidone; formamide; N,N-dimethylformamide; N,N-dimethylacetamide; N,N-dimethylimidazolidinone; dimethyl sulfoxide; hexamethylphosphoric triamide; sulfolane; γ-butyrolactone; tetrahydrofuran; dioxane; dichloromethane; chloroform; and 1,2-dichloroethane. Of those, cyclohexanone, N-methyl-2-pyrrolidone, N,N-dimethylacetamide, and tetrahydrofuran are preferable. Each of those solvents may be used alone, or two or more of them may be used as a mixture.

A solvent having a low surface tension may be used in addition to the above-mentioned solvents as required for the purpose of improving application property. Specific examples of such solvent include: alkyl lactate; 3-methyl-3-methoxybutanol; tetralin; isophorone; ethylene glycol-monoalkyl ether (such as ethylene glycol monobutyl ether); diethylene glycol monoalkyl ether such as diethylene glycol monoethyl ether; ethylene glycol monoalkyl (or phenyl) acetate; triethylene glycol monoalkyl ether; propylene glycol monoalkyl ether such as propylene glycol monobutyl ether; and dialkyl malonate such as diethyl malonate. Many of those solvents are poor solvents with respect to the above-described good solvents. Therefore, each of those solvents is preferably added in such an amount that dissolved components do not precipitate.

A varnish for forming a liquid crystal alignment layer can be obtained by dissolving any one of the above-mentioned polymers into an appropriate solvent.

A solvent to be used in the application solution (embrocation) in the present invention is not particularly limited as long as it is a solvent capable of dissolving the polymer. Specific examples of the solvent include: toluene; xylene; mesitylene; cyclopentanone; cyclohexanone; N-methyl-2-pyrrolidone; formamide; N,N-dimethylformamide; N,N-dimethylacetamide; N,N-dimethylimidazolidinone; dimethyl sulfoxide; hexamethylphosphoric triamide; sulfolane; γ-butyrolactone; tetrahydrofuran; dioxane; dichloromethane; chloroform; 1,2-dichloroethane; alkyl lactate; 3-methyl-3-methoxybutanol; tetralin; isophorone; ethylene glycol monoalkyl ether such as ethylene glycol monobutyl ether; diethylene glycol monoalkyl ether such as diethylene glycol monoethyl ether; an ethylene glycol monoalkyl (or phenyl) acetate; a triethylene glycolmonoalkyl ether; propylene glycol monoalkyl ether such as propylene glycol monobutyl ether; and dialkyl malonate such as diethyl malonate. Of those, cyclohexanone, N-methyl-2-pyrrolidone, N,N-dimethylacetamide, tetrahydrofuran, and propylene glycol monomethyl ether acetate are preferable. Each of those solvents may be used alone, or two or more of them may be used as a mixture.

The concentration of the polymer in the varnish for forming a liquid crystal alignment layer in the present invention is preferably, but not limited to, 5 wt % to 50 wt %.

The varnish of the present invention may be blended with a silane- or titanium-based coupling agent for additionally improving the adhesiveness of an alignment layer to a glass substrate. Examples of a silane coupling agent include: aminopropyltrimethoxysilane; aminopropyltriethoxysilane; vinyltrimethoxysilane; N-(2-aminoethyl)-3-aminopropylmethyldimethoxysilane; N-(2-aminoethyl)-3-aminopropyltrimethoxysilane; vinyltriethoxysilane; 3-methacryloylpropyltrimethoxysilane; 3-glycidoxypropyltrimethoxysilane; 3-glycidoxypropylmethyldimethoxysilane; and 2-(3,4-epoxycyclohexyl)ethyltrimethoxysilane. Silicone oil such as polydimethylsiloxane and polydiphenylsiloxane may be blended.

The ratio at which the varnish for forming a liquid crystal alignment layer is blended with a coupling agent or silicone oil is not particularly limited. A coupling agent or silicone oil may be blended in an amount of preferably 0.01 to 5% by weight, or more preferably 0.1 to 3% by weight with respect to the total weight of polymer components of the varnish of the present invention. However, the range is a general standard for using a silane coupling agent, and is not specific to the present invention.

The varnish of the present invention can be blended with another additive as required in addition to the above-mentioned coupling agent. For example, when an improvement of application property, an improvement of antistatic property, or the like is desired, a surfactant may be added into the varnish in accordance with each purpose. Examples of the surfactant include an anionic surfactant, a cationic surfactant, an amphoteric surfactant, and a nonionic surfactant. Each of them can be used so long as the properties of an alignment layer are not impaired.

An alignment layer is formed by applying a varnish for forming a liquid crystal alignment layer onto a substrate and baking the resultant substrate. A glass substrate, a plastic substrate, a film-like substrate, or the like can be used as a substrate.

Examples of a generally known application method include a spinner method, a printing method, a dipping method, and a dropping method. Those methods are applicable to the present invention.

Examples of a generally known method for baking the varnish for forming a liquid crystal alignment layer include a method comprising performing a heat treatment in an oven or an infrared furnace and a method comprising performing a heat treatment on a hot plate. Those methods are applicable to the present invention.

A heat treatment step is generally performed at a temperature of about 80 to 300° C. In particular, when a plastic substrate is used, the step is preferably performed at a low temperature of about 120 to 160° C. in consideration of the heatproof temperature of the substrate.

Liquid crystal-sandwiching substrates can be provided by arranging a first substrate on which a first alignment layer is formed using the varnish of the present invention and a second substrate on which a second alignment layer identical to or different from the first alignment layer is formed so as to be opposite to each other, and introducing a liquid crystal between the first and second substrates.

A liquid crystal display element using the liquid crystal-sandwiching substrates can be provided by means of a known method. The liquid crystal display element may operate at TN, STN, IPS, VA, OCB, ferroelectric, or antiferroelectric mode. The varnish of the present invention can be used for any liquid crystal display element which is used by controlling the arrangement of a liquid crystal molecule by means of an alignment layer to change the state of arrangement of the liquid crystal molecule.

When the alignment layer of the present invention is used for preparation of a liquid crystal element which operates at TN, STN, IPS or OCB mode, the type of a liquid crystal composition having positive dielectric anisotropy used therewith is not particularly limited, and any type of a liquid crystal composition having positive dielectric anisotropy can be used. Examples of a preferable crystal composition include those disclosed in: JP3086228, JP2635435, JP05-501735A, JP08-157828A, JP08-231960A, JP09-241644A (EP 885272 A1), JP09-302346A (EP 806466 A1), JP08-199168A (EP 722998 A1), JP09-235552A, JP09-255956A, JP09-241643A (EP 885271 A1), JP10-204016A (EP 844229 A1), JP10-204436A, JP10-231482A, JP2000-087040A, JP2001-048822A, and the like.

Furthermore, when the alignment layer of the present invention is used for preparation of a liquid crystal element which operates at VA mode, the type of a liquid crystal composition having negative dielectric anisotropy used therewith is not particularly limited, and any type of a liquid crystal composition having negative dielectric anisotropy can be used. Examples of a preferable crystal composition include those disclosed in: JP57-114532A, JP02-004725A, JP04-224885 A, JP08-040953A, JP08-104869A, JP10-168076A, JP10-168453A, JP10-236989A, JP10-236990A, JP10-236992A, JP10-236993A, JP10-236994A, JP10-237000A, JP10-237004A, JP10-237024A, JP10-237035A, JP10-237075A, JP10-237076A, JP10-237448A (EP 967261), JP10-287874A, JP10-287875A, JP10-291945A, JP11-029581A, JP11-080049A, JP2000-256307A, JP2001-019965A, JP2001-072626A, JP2001-192657A, and the like.

EXAMPLES

Hereinafter, the present invention will be described in more detail by referring to the examples. However, the present invention is not limited to the examples.

Example 1

Synthesis Example 1

170.0 g (141.0 mM) of the compound (1), 51.9 g (46.9 mM) of the compound (2), 45.9 g (35.3 mM) of the compound (3), and 1,071 g of toluene were loaded into a 2-L four-necked flask equipped with a temperature gauge, a cooling tube, a stirring machine, and an oil bath, and followed by heating at 80° C. with stirring under a nitrogen seal. When the temperature of the reaction solution reached 80° C., 100 µl of Karstedt catalyst was added to the solution, and followed by stirring for 2 hours at the temperature. After the completion of the stirring, the oil bath was replaced in an ice bath, and the temperature of the reaction solution was cooled to less than 10° C. The reaction solution was transferred to a round-bottomed flask, and a toluene solvent was removed by means of an evaporator. After that, the resultant was dried at 40° C. and 0.4 kPa for 8 hours to yield 265.0 g of a white solid. The resultant solid had a weight-average molecular weight (Mw) of 3,200. The molecular weight was determined by means of GPC device JASCO GULLIVER 1500 manufactured by JASCO (intelligent differential refractometer RI-1530) under the following conditions. Column: four columns, G4000 HXL, G3000HXL, G2500 HXL, and G2000 HXL manufactured by TOSHO CORPORATION, were connected in this order and used.

Column temperature: 40° C.

Developing solvent: THF

Flow rate: 1 ml/min

Standard substance: polystyrene having a known molecular weight

Hereinafter, molecular weights were determined in the same way.

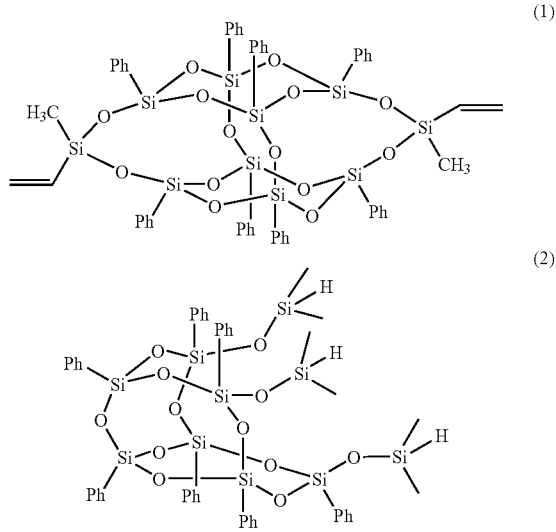

-continued

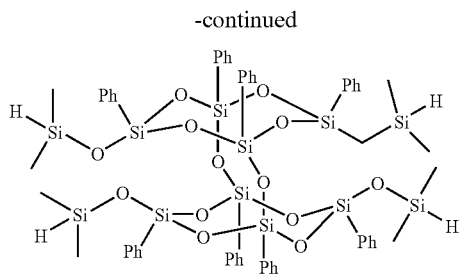
(3)

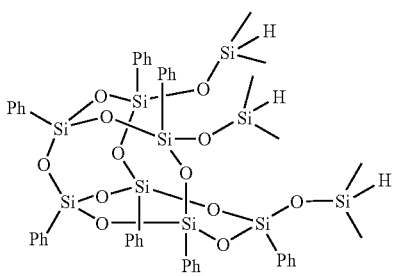
(2)

Example 2

Synthesis Example 2

170.3 g (141.2 mM) of the compound (1), 51.3 g (46.4 mM) of the compound (2), 11.6 g (35.3 mM) of the compound (4), and 932.8 g of toluene were loaded into a 2-L four-necked flask equipped with a temperature gauge, a cooling tube, a stirring machine, and an oil bath, and followed by heating at 80° C. with stirring under a nitrogen seal. When the temperature of the reaction solution reached 80° C., 100 μl of Karstedt catalyst was added to the liquid, and followed by stirring for 3 hours at the same temperature. After the completion of the stirring, the oil bath was replaced in an ice bath, and the temperature of the reaction solution was cooled to less than 10° C. The reaction solution was transferred to a round-bottomed flask, and toluene solvent was removed by means of an evaporator. After that, the resultant was dried at 40° C. and 0.4 kPa for 8 hours, and thereby 233.0 g of a white solid was obtained. The resultant solid had a molecular weight (Mw) of 14,600.

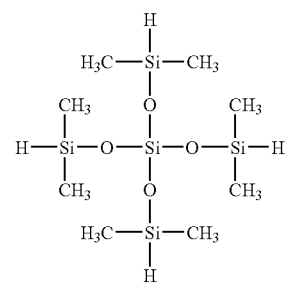
(4)

Example 3

Synthesis Example 3

0.50 g of the compound (6), 0.75 g of N,N-dimethylacetamide, and 0.75 g of cyclohexanone were loaded into a 10-ml three-necked flask equipped with a temperature gauge, a magnetic stirrer, and a stirrer chip, and the whole was stirred at room temperature under a nitrogen seal to dissolve the compound (6). Then, 0.50 g of the compound (7) was added thereto, and followed by stirring at room temperature for 4 hours, and thereby an extremely pale yellow transparent polyamic acid solution was obtained.

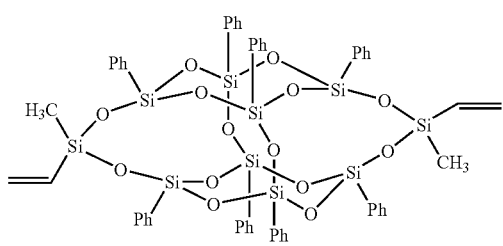
(1)

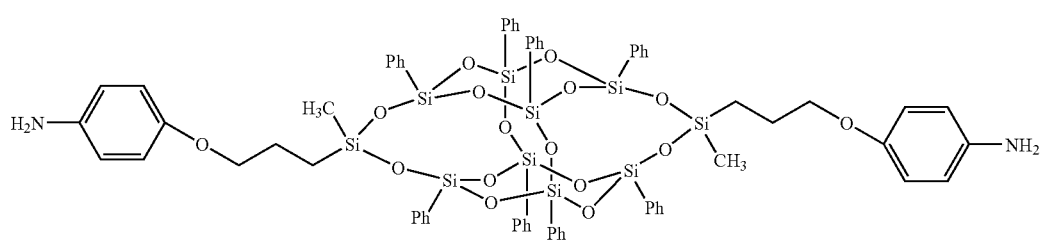
(6)

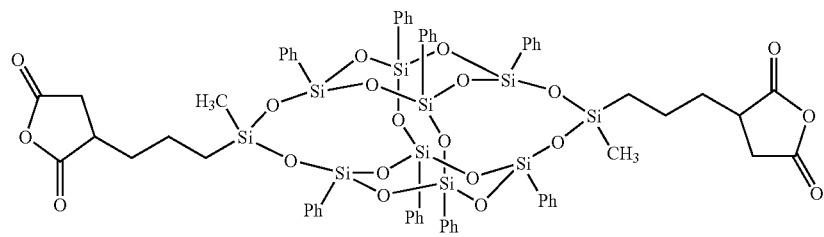
(7)

Example 4

Synthesis Example 4

0.82 g of the compound (6), 0.82 g of N,N-dimethylacetamide, and 0.75 g of cyclohexanone were loaded into a 10-ml three-necked flask equipped with a temperature gauge, a magnetic stirrer, and a stirrer chip, and the whole was stirred at room temperature under a nitrogen seal to dissolve the compound (6). Then, 0.18 g of 3,3',4,4'-benzophenonetetracarboxylic Dianhydride was added thereto, and followed by stirring at room temperature for 4 hours, and thereby an extremely pale yellow transparent polyamic acid solution was obtained.

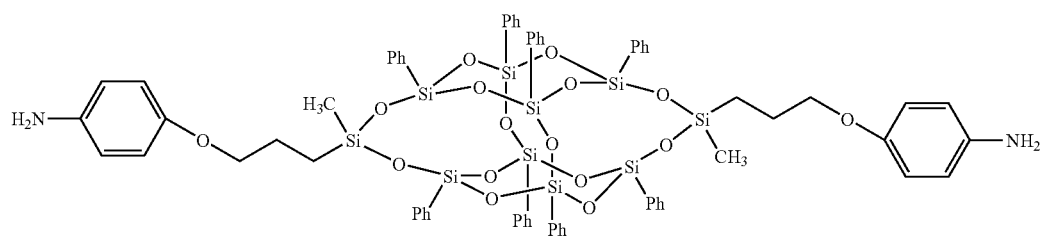
(6)

Example 5

Synthesis Example 5

0.12 g of 4,4'-diaminodiphenyleter, 0.75 g of N,N-dimethylacetamide, and 0.75 g of cyclohexanone were loaded into a 10-ml three-necked flask equipped with a temperature gauge, a magnetic stirrer, and a stirrer chip, and the whole was stirred at room temperature under a nitrogen seal to dissolve 4,4'-diaminodiphenyleter. Then, 0.88 g of the compound (7) was added thereto, and followed by stirring at room temperature for 4 hours, and thereby an extremely pale yellow transparent polyamic acid solution was obtained.

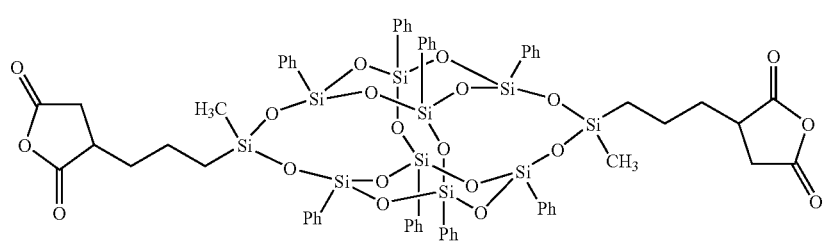
(7)

Example 6

Synthesis Example 6

0.05 g of 4,4'-diaminodiphenyleter, 0.27 g of the compound (9), 0.75 g of N,N-dimethylacetamide, and 0.75 g of cyclohexanone were loaded into a 10-ml three-necked flask equipped with a temperature gauge, a magnetic stirrer, and a stirrer chip, and the whole was stirred at room temperature under a nitrogen seal to dissolve 4,4'-diaminodiphenyleter and the compound (9). Then, 0.68 g of the compound (7) was added thereto, and followed by stirring at room temperature for 4 hours, and thereby an extremely pale yellow transparent polyamic acid solution was obtained.

size of 1 μm. The solvent was distilled off from the filtrate at room temperature and under reduced pressure (0.4 kPa), and thereby 5.8 g of a white solid was obtained. The resultant solid had a molecular weight Mw of 44,700.

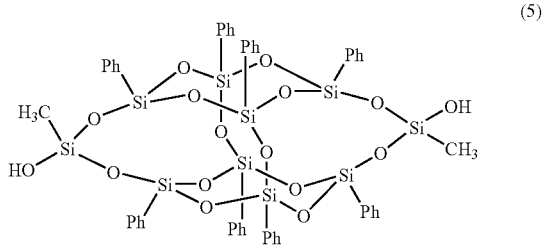

(5)

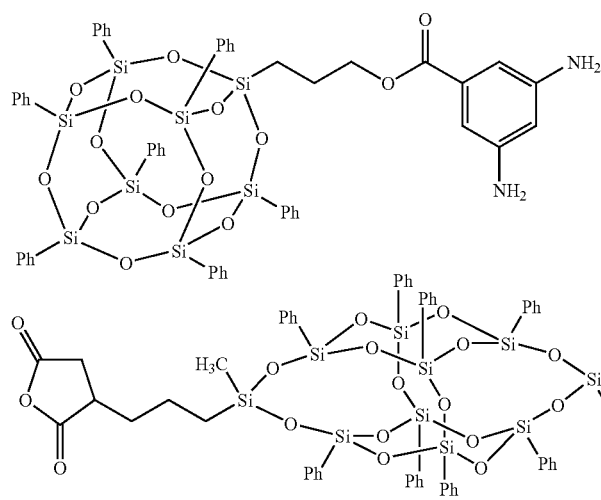

(9)

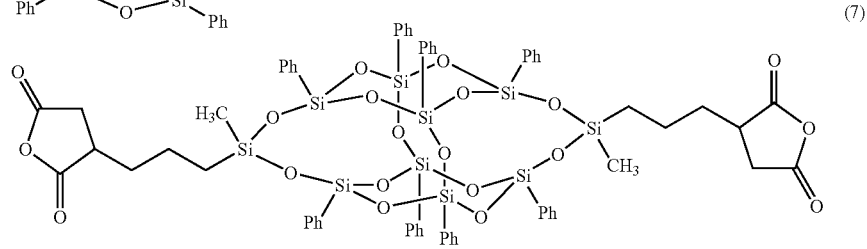

(7)

Example 7

Synthesis Example 7

5.00 g (4.22 mM) of the compound (5), 0.95 g (4.22 mM) of 1,4-bis(hydroxydimethylsilyl)benzene, 29.8 g of ethyl acetate, and 29.8 g of toluene were loaded into a 100-ml four-necked flask, and followed by heating at 50° C. with stirring under a nitrogen seal. When the temperature of the solution reached 50° C., 0.059 g of a catalyst (tetramethylguanidium-2-ethylhexanoic acid) was added into the solution, and then, the resultant solution was subjected to azeotropic dehydration for 16 hours. After the temperature of the reaction solution was cooled to room temperature, the solution was filtered with a PTFE membrane filter having pore

Example 8

Synthesis Example 8

0.2 g of the Compound (8) and 1.8 g of dimethylacetamide were loaded into a 10-ml three-necked flask equipped with a temperature gauge, a magnetic stirrer, and a stirrer chip, and the whole was stirred under a nitrogen seal to dissolve the compound (8). Then, 0.21 g of the compound (7) was added thereto, and followed by stirring.

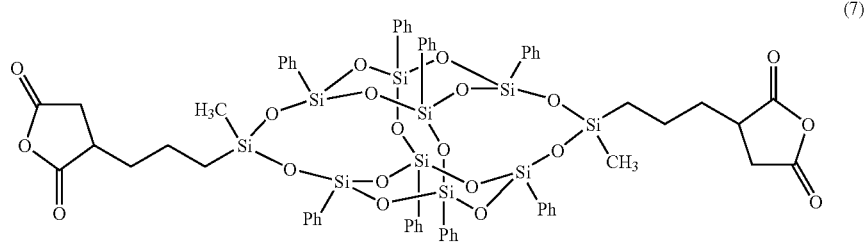

(7)

-continued

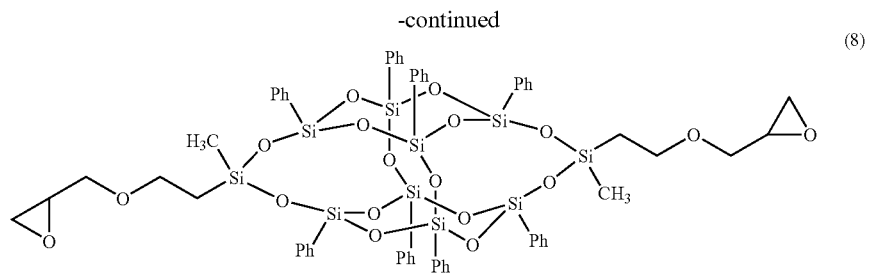

(8)

Preparation of Varnish 4.01 g of the polymer obtained in Example 1 was dissolved into 6.00 g of propylene glycol monomethyl ether acetate, and the obtained solution was filtered through a filter made of PTFE having pore size of 0.2 μm. The filtrate solution was defined as Varnish 1.

4.00 g of the polymer obtained in Example 2 was dissolved into 7.01 g of propylene glycol monomethyl ether acetate, and the obtained solution was filtered through a filter made of PTFE having pore size of 0.2 μm. The filtrate solution was defined as Varnish 2.

The polyamic acid solution obtained in Example 3 was filtered through a filter made of PTFE having pore size of 0.2 μm. The filtrate solution was defined as Varnish 3.

The polyamic acid solution obtained in Example 4 was filtered through a filter made of PTFE having pore size of 0.2 μm. The filtrate solution was defined as Varnish 4.

The polyamic acid solution obtained in Example 5 was filtered through a filter made of PTFE having pore size of 0.2 μm. The filtrate solution was defined as Varnish 5.

The polyamic acid solution obtained in Example 6 was filtered through a filter made of PTFE having pore size of 0.2 μm. The filtrate solution was defined as Varnish 6.

Antiweatherability Test-1

Varnishes 1-6 obtained in each of the above-described Examples 1-6 were evaluated together with a polyamic acid varnish which was commercially available and did not contain any silsesquioxane derivative (Comparative Example 1). Each of the varnishes was applied onto a glass substrate by using a spinner, and followed by preliminarily baking at 80° C. for 3 minutes, and then baking at 230° C. for 60 minutes, and thereby, samples for antiweatherability test were obtained. The thickness of the film formed on the glass substrate was 1 to 5 μm.

Antiweatherability Test-2

An accelerated antiweatherability test was performed by means of a xenon weather-o-meter (Ci 65A manufactured by ATLAS) according to the standard of JIS K 7350-2 at a black panel temperature of 83±3° C. and a relative humidity of 50% and without water spraying. The external appearance of the antiweatherability test samples was visually observed at the time point of 250 hours and 500 hours during the test. Table 1 shows the results. Indications in the table are as follows.

○: Neither roughening of a film surface nor reduction in film occurs x: both the roughening of a film surface and a reduction in film occur.

TABLE 1

|  | External appearance (after 250 hours) | External appearance (after 500 hours) |
| --- | --- | --- |
| Example 1 | ○ | ○ |
| Example 2 | ○ | ○ |
| Example 3 | ○ | ○ |
| Example 4 | ○ | ○ |
| Example 5 | ○ | ○ |
| Example 6 | ○ | ○ |
| Comparative Example 1 | x | x |

Production of a Liquid Crystal Cell (1)

The polymer obtained from the compound of Synthesis Example 1 was diluted with NMP-BC-mixed solvent (weight ratio of 1/1) to adjust a concentration of the polymer to be 3 wt %, and thereby, a varnish for forming a liquid crystal alignment layer was obtained. The diluted varnish was applied onto a substrate having a transparent electrode by using a spinner, and followed by preliminarily baking at 80° C. for about 5 minutes, and then baking at 230° C. for 60 minutes, and thereby, an alignment layer having a thickness of 60 nm was formed. The entire surface of the layer was rubbed, and thereby a substrate subjected to an alignment treatment was obtained. A gap material of 20 μm was scattered on the alignment layer surface of the substrate. Then, the other substrate, which is identical to the above-prepared substrate, was superimposed thereon in such a manner that the alignment layer surfaces of the both substrates face each other, and followed by sealing with a UV-curable sealing compound, and thereby an antiparallel cell having a gap of 20 μm was obtained.

The liquid crystal composition 1 as shown below was injected into the cell, and an injection port was sealed with a photocuring agent, and followed by heat treatment at 110° C. for 30 minutes, and thereby, a homogeneously aligned cell was obtained. The cell was sandwiched between two polarizing plates arranged in a crossed Nichol state, and was rotated therein. As a result, uniform and clear contrast with no alignment failure due to a flaw generated on the alignment layer by rubbing was observed. Therefore, it was confirmed that a liquid crystal molecule was appropriately aligned by rubbing.

Production of Liquid Crystal Cell (2)

The polymer obtained from the compound of Synthesis Example 2 was diluted with NMP-BC-mixed solvent (weight ratio of 1/1) to adjust a concentration of the polymer to be 3 wt %, and thereby, a varnish for forming a liquid crystal alignment layer was obtained. The diluted varnish was applied onto a substrate having a transparent electrode by using a spinner, and followed by preliminarily baking at 80° C. for about 5 minutes, and then baking at 230° C. for 60 minutes, and thereby, an alignment layer having a thickness of 60 nm was formed. The entire surface of the layer was rubbed, and thereby a substrate subjected to an alignment treatment was obtained. A gap material of 20 μm was scattered on the alignment layer surface of one substrate. Then, the other substrate, which is identical to the above-prepared substrate, was superimposed thereon in such a manner that the alignment layer surfaces of the substrates face each other, and followed by sealing with a UV curable sealing compound, and thereby an antiparallel cell having a gap of 20 μm was obtained.

The liquid crystal composition 1 as shown below was injected into the cell, and an injection port was sealed with a photocuring agent, and followed by heat treatment at 110° C. for 30 minutes, and thereby a homogeneously aligned cell was obtained. The cell was sandwiched between two polarizing plates arranged in a crossed Nichol state, and was rotated therein. As a result, uniform and clear contrast with no alignment failure due to a flaw generated on the alignment layer by rubbing was observed. Therefore, it was confirmed that a liquid crystal molecule was appropriately aligned by rubbing.

Hereinafter, a method of producing a compound to be used for producing a polymer in the varnish of the present invention will be exemplified as Reference examples.

Reference Example 1

Synthesis of the Compound (3-1-1)

Phenyltrimethoxysilane (6.54 kg), 2-propanol (26.3 liters), pure water (0.66 kg), and sodium hydroxide (0.88 kg) were loaded into a 50-liter reaction vessel equipped with a reflux condenser, a temperature gauge, and a stirring device, and followed by sealing with dry nitrogen. The resultant solution was heated with stirring, and reaction was conducted for 5 hours in a reflux state. After the completion of the reaction, a heater was removed from the reaction vessel, and the vessel was left to stand for 15 hours at room temperature so that a reaction mixture became cool. A supernatant liquid was removed from the thus obtained reaction mixture by means of decantation. Then, a white solid that remained in the reaction vessel was washed with 2-propanol (9,87 kg) once. The washed solid was transferred to a stainless bat lined with a polytetrafluoroethylene sheet, and was dried by means of a vacuum dryer at a temperature in the bat of 80° C. and a pressure of 6.7 ×10$^{-4}$ MPa for 24 hours, and thereby, 2.22 kg of a white powdery compound (3-1-1) was obtained.

Reference Example 2

Introduction of Trimethylsilyl Group into the Compound (3-1-1)

1.2 g of the compound (3-1-1), 10 g of tetrahydrofuran, and 1.6 g of triethylamine were loaded into a 50-ml four-necked flask equipped with a reflux condenser, and followed by sealing with dry nitrogen. 2.2 g of trimethylchlorosilane was dropped into the solution in about 1 minute while keeping the temperature of the solution at 15° C. to 20° C. and stirring with a magnetic stirrer. After the completion of the dropping, the resultant solution was stirred at 15° C. for 3.5 hours, followed by washing with pure water and drying in a vacuum, and thereby, a white solid (1.2 g) was obtained. The solid was defined in the compound (3-T).

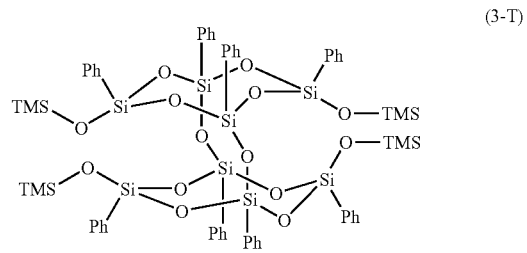

(3-T)

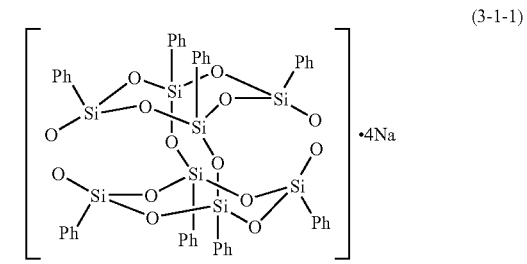

(3-1-1)

Reference Example 3

Synthesis of the Compound (a)

Together with a stirrer, 11.6 g of the compound (3-1-1) obtained by the method of Example 1, and 100 g of tetrahydrofuran were loaded into a 300-ml three-necked flask equipped with a dropping funnel, a temperature gauge, and a reflux condenser, and followed by sealing with dry nitrogen. 3.4 g of methyldichlorosilane was dropped therein while stirring with the magnetic stirrer. After the completion of the dropping, the resultant solution was further stirred at room temperature for 1 hour. After the completion of the reaction, 50 g of pure water were charged therein to dissolve the produced sodium chloride and, at the same time, to hydrolyze unreacted methyldichlorosilane. The thus obtained reaction mixture was transferred to a separating funnel to be separated into an organic layer and an aqueous layer. After having been washed with a saturated saline solution, the obtained organic layer was repeatedly washed with water until it became neutral. Then, the resultant organic layer was dried with anhydrous magnesium sulfate and concentrated under reduced pressure by means of a rotary evaporator. Then, the resultant residue was washed with methanol and dried, and thereby, 6.9 g of a white powdery solid was obtained. The following analysis data suggested that the compound had a structure represented by the formula (a).

$^1$H NMR (400 MHz, CDCl$_3$, TMS standard:δ=0.0 ppm): 0.37 (s, 6H), 4.99 (s, 2H), 7.15 to 7.56 (m, 40H).

$^{29}$Si NMR (79 MHz, CDCl$_3$, TMS standard:δ=0.0 ppm): −32.78 (s, 2Si), −77.91 (s, 4Si), −79.39 (t, 4Si).

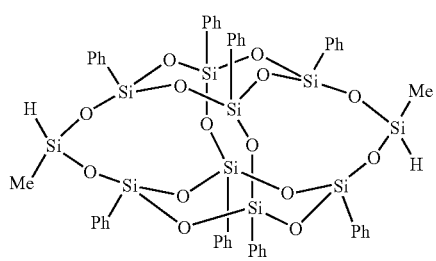

(5-1)

Reference Example 4

Production of the Compound (1-3-7)

The compound (1-3-7) was produced by the following procedures.

solution was stirred at room temperature for 5 hours, and then, water was added, and extracted with diethyl ether. The obtained organic layer was washed with waster, and dried with anhydrous magnesium sulfate. A residue obtained by distilling off the solvent under reduced pressure was purified by means of silica gel column chromatography (eluting solvent: toluene). After toluene had been distilled off under reduced pressure, the resultant substance was recrystallized from ethanol, and thereby allyl-p-nitrophenyl ether (25.7 g) was obtained.

Second Step: Production of the Compound (b)

In a nitrogen atmosphere, 500 ml of toluene was added to suspend the compound (a) (50.0 g, 43.3 mmol), and then, a platinum-divinylsiloxane complex (3-wt % toluene solution, 25 μl) was added thereto, and followed by heating at 90° C. 16.3 g of allyl-p-nitrophenyl ether (91 mmol) was dropped to the resultant solution in 5 minutes, and followed by heating for 2 hours in a reflux state. After having the solution stood to

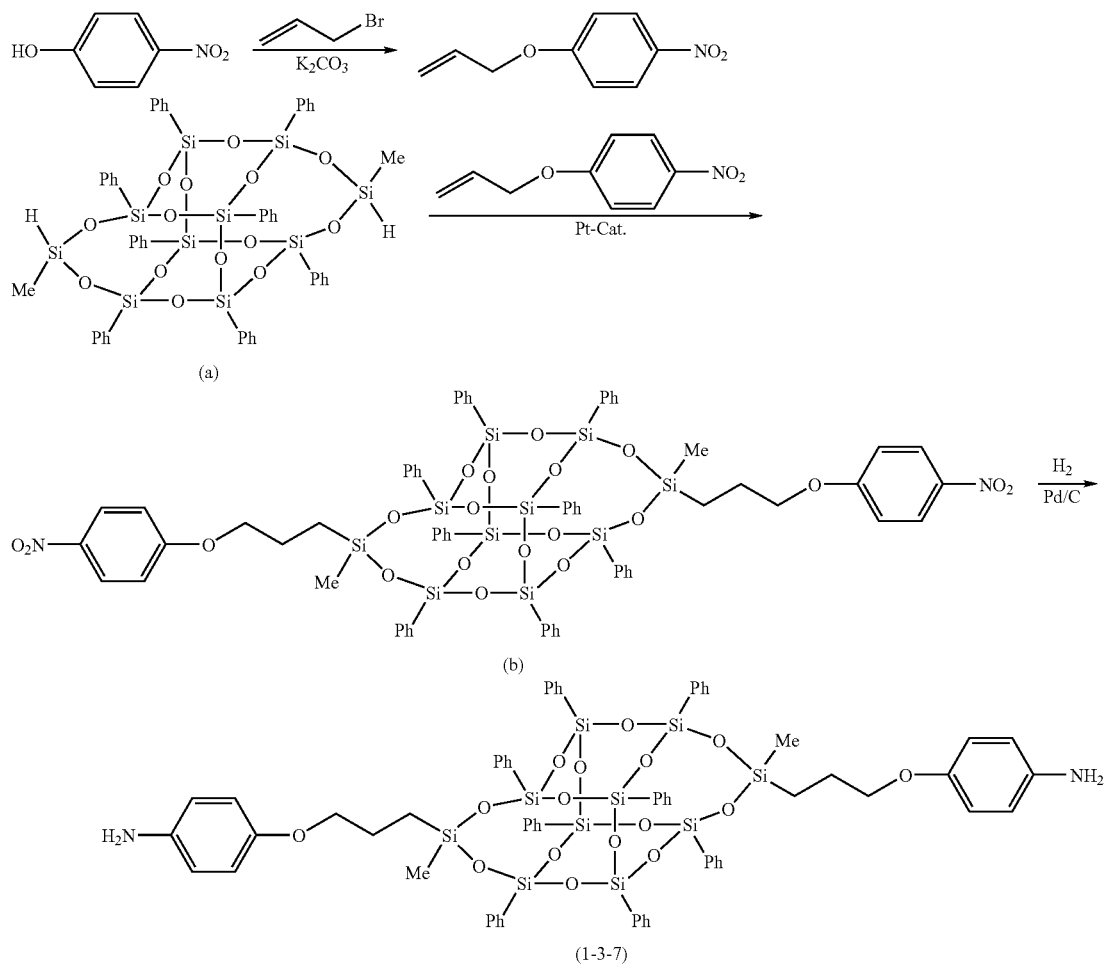

First Step: Production of Allyl-p-nitrophenyl Ether

In a nitrogen atmosphere, 49.7 g of potassium carbonate (0.36 mol) was added to 250 ml of N,N-dimethylformamide solution containing p-nitrophenol (25.0 g, 0.18 mol), and then, 21.7 g of 3-bromopropene (0.18 mol) was dropped thereto. After the completion of the dropping, the resultant cool, toluene (100 ml) and water (300 ml) were added thereto for extraction. The organic layer was washed with water and dried with anhydrous magnesium sulfate. A residue obtained by distilling off toluene under reduced pressure was purified by means of silica gel column chromatography (eluting solvent: toluene). After toluene had been distilled off under reduced pressure, the resultant substance was recrystallized from ethanol/ethyl acetate, and thereby 18.7 g of the compound (b) was obtained.

$^1$H-NMR (solvent: CDCl$_3$): δ(ppm); 0.34 (s, 6H), 0.85 to 0.88 (t, 4H), 1.92 to 1.95 (m, 4H), 3.85 to 3.88 (t, 4H), 6.60 to 6.63 (d, 4H), 7.15 to 7.52 (m, 40H), 7.94 to 7.97 (d, 4H).

$^{29}$Si-NMR (solvent: CDCl$_3$): δ(ppm); −17.8 (d, 2Si), −78.5 (s, 4Si), −79.4 (t, 4Si).

Third Step: Production of the Compound (1-3-7)

A mixture of the compound (b) (10.0 g, 6.61 mmol), Pd/C (1 g), and THF (100 ml) was stirred in a hydrogen atmosphere at room temperature for 120 hours. After Pd/C had been filtered out, THF was distilled off under reduced pressure. The resultant residue was purified by means of silica gel column chromatography (eluting solvent: ethyl acetate). Ethyl acetate was distilled off under reduced pressure, and thereby 6.3 g of the compound (1-3-7) was obtained.

$^1$H-NMR (solvent: CDCl$_3$): δ(ppm); 0.31 (s, 6H), 0.83 to 0.87 (t, 4H), 1.82 to 1.87 (m, 4H), 3.71 to 3.74 (t, 4H), 6.51 to 6.57 (d, 8H), 7.14 to 7.95 (m, 40H).

$^{29}$Si-NMR (solvent: CDCl$_3$): δ(ppm); −17.5 (d, 2Si), −78.6 (s, 4Si), −79.6 (t, 4Si).

Reference Example 5

Production of the Compound (1-1-4)

The compound ((1-1-4) was produced by the following procedures.

In a nitrogen atmosphere, 150 ml of THF was added to suspend the compound (a) (50.0 g, 43.3 mmol), and then, a platinum-divinylsiloxane complex (3-wt % toluene solution, 320 μl) was added thereto, and followed by heating to 90° C. 14.5 g of allylsuccinic anhydride (103.5 mmol) was dropped thereto in 5 minutes, and followed by heating for 7 hours in a reflux state. After having the solution stood to cool, the solvent was distilled off under reduced pressure. 150 ml of methanol was added to the resultant residue, and followed by stirring at room temperature for 2 hours. A solid was filtered out and dissolved into THF (150 ml). 6 g of activated carbon was added to the obtained solution, and followed by stirring at room temperature for 2 hours. After the activated carbon had been filtered out, THF was distilled off under reduced pressure, and thereby 55.9 g of the compound (1-1-4) was obtained.

$^1$H-NMR (solvent: CDCl$_3$): δ(ppm); 0.32 (s, 6H), 0.70 to 0.79 (t, 4H), 1.32 to 1.42 (m, 6H), 1.74 to 1.80 (m, 2H), 1.89 to 1.99 (m, 2H), 2.24 to 2.37 (m, 2H), 2.51 to 2.60 (m, 2H), 7.15 to 7.56 (m, 40H).

$^{29}$Si-NMR (solvent: CDCl$_3$): δ(ppm); −18.1 (d, 2Si), −78.5 (s, 4Si), −79.4 to −79.8 (t, 4Si)

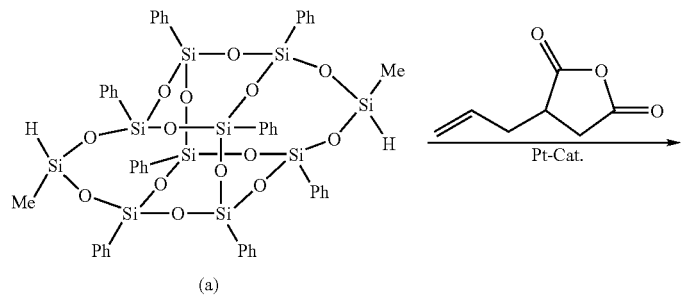

(a)

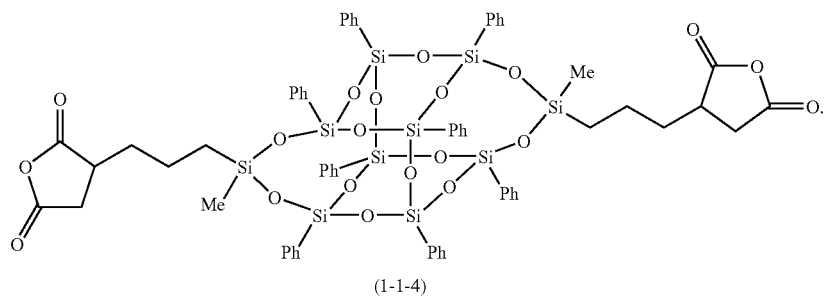

(1-1-4)

Reference Example 6

<Production of Compound (1-1-5)>

The compound (1-1-5) was produced by the following procedures.

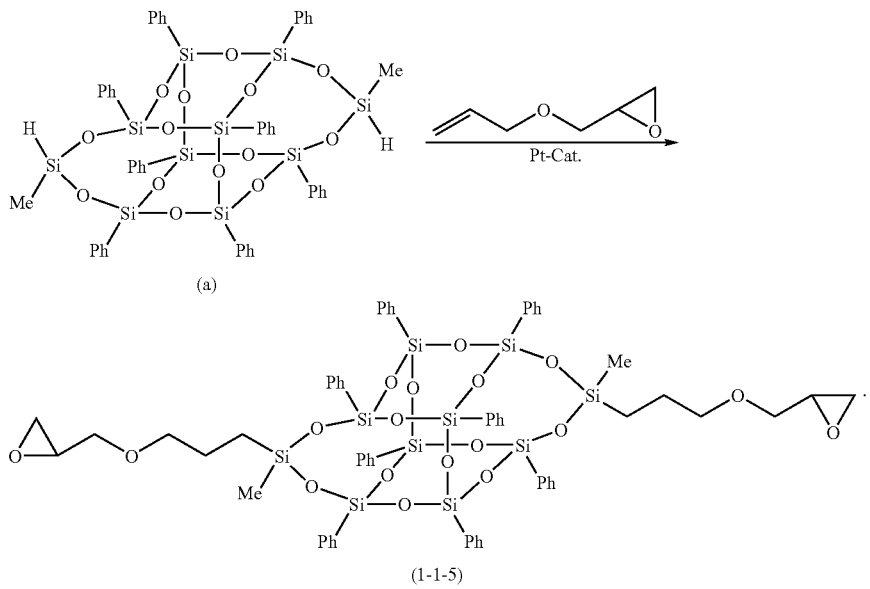

(a)

(1-1-5)

In a nitrogen atmosphere, 50 ml of toluene was added to suspend the compound (a) (5.0 g, 4.33 mmol), and then, a platinum-divinylsiloxane complex (3-wt % toluene solution, 30 μl) was added thereto, followed by heating at 90° C. 1.04 g of allylglycidyl ether (9.1 mmol) was dropped thereto, and followed by heating for 3 hours in a reflux state. After having the solution stood cool, extraction was conducted by adding toluene (50 ml) and water (100 ml). The obtained organic layer was washed with water and dried with anhydrous magnesium sulfate. A residue obtained by distilling toluene off under reduced pressure was purified by means of silica gel column chromatography (eluting solvent: toluene/ethyl acetate). After the solvent had been distilled off under reduced pressure, the resultant substance was recrystallized from ethanol/ethyl acetate, and thereby 1.6 g of the compound (1-1-5) was obtained.

$^1$H-NMR (solvent: CDCl$_3$): δ(ppm); 0.30 (s, 6H), 0.73 to 0.76 (t, 4H), 1.66 to 1.72 (m, 4H), 2.42 to 2.44 (m, 2H), 2.64 to 2.66 (m, 2H), 2.95 to 2.98 (m, 2H), 3.15 to 3.19 (m, 2H), 3.28 to 3.39 (m, 4H), 3.44 to 3.48 (m, 2H), 7.18 to 7.53 (m, 40H).

$^{29}$Si-NMR (solvent: CDCl$_3$): δ(ppm); −17.4 (s, 2Si), −78.6 (s, 4Si), −79.5 to −79.6 (t, 4Si).

INDUSTRIAL APPLICABILITY

The organic-inorganic alignment layer composed of the polysilsesquioxane-containing polymer of the present invention is useful in an apparatus to be exposed to strong light such as a liquid crystal projector, because the alignment layer is not hygroscopic property and excellent in light resistance.

The invention claimed is:

1. A varnish for forming a liquid crystal alignment layer comprising:

a polymer obtained by reacting a silsesquioxane derivative represented by the formula (1-4) with a diamine; and a solvent,

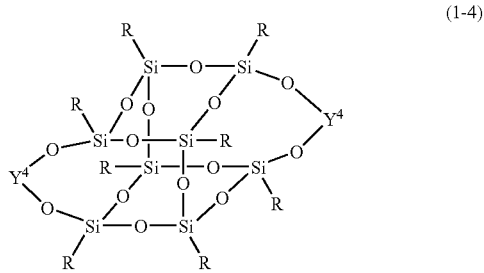

(1-4)

where in the formula (1-4), R independently an unsubstituted phenyl, cyclopentyl, cyclohexyl, or t-butyl, and Y$^4$ independently represent a group represented by the formula (a-4) or (b-1),

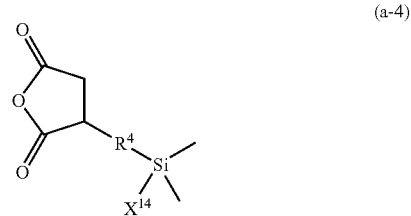

(a-4)

-continued

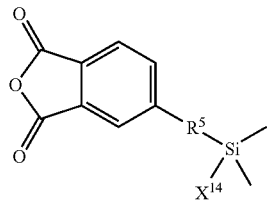
(b-1)

$R^4$ represents a divalent organic group having 1 to 20 carbon atoms, $X^{14}$ represents an alkyl having 1 to 4 carbons atoms or unsubstituted phenyl, $R^5$ represents a single bond or a divalent organic group having 1 to 20 carbons atoms, and $X^{14}$ represents an alkyl having 1 to 4 carbons atoms or an unsubstituted phenyl, wherein at least one kind of the diamine is a silsesquioxane derivative represents by the formula (9-1),

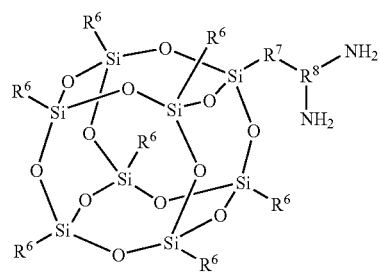
(9-1)

where in the formula (9-1), $R^6$ independently represents an alkyl having 1 to 20 carbon atoms, alkenyl having 2 to 20 carbon atoms, or aryl having 6 to 20 carbon atoms, whereby optional —$CH_2$— may be replaced by —O—, and optional hydrogen may be replaced by halogen, $R_7$ represents a single bond or a divalent organic group having 1 to 15 carbon atoms, and $R^8$ represents a trivalent organic group having 1 to 15 carbon atoms.

2. The varnish according to claim 1, wherein R is an unsubstituted phenyl.

3. A varnish for forming a liquid crystal alignment layer comprising:
   a polymer obtained by reacting a silsesquioxane derivative represented by the formula (1-4) with a silsesquioxane derivative represented by the formula (9-1); and
   a solvent,

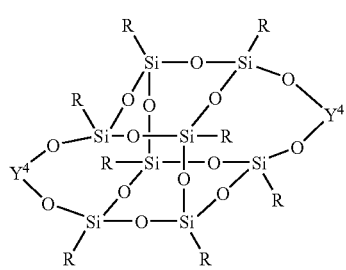
(1-4)

where in the formula (1-4), R independently represents an unsubstituted phenyl, cyclopentyl, cyclohexyl, or t-butyl, and $Y^4$ independently represents a group represented by the formula (a-4) or (b-1),

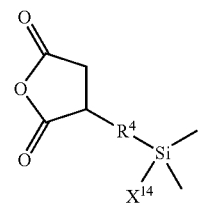
(a-4)

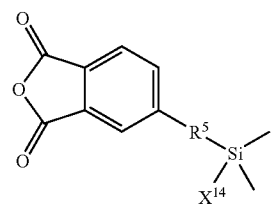
(b-1)

$R^4$ represents a divalent organic group having 1 to 20 carbon atoms, $X^{14}$ represents an alkyl having 1 to 4 carbon atoms or unsubstituted phenyl, $R^5$ represents a single bond or a divalent organic group having 1 to 20 carbon atoms, and $X^{14}$ represents an alkyl having 1 to 4 carbon atoms or unsubstituted phenyl,

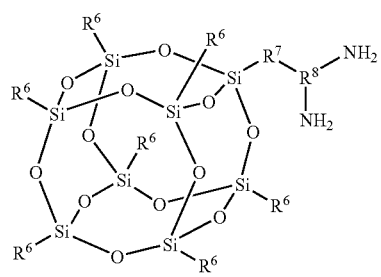
(9-1)

where in the formula (9-1), $R^6$ independently represents an alkyl having 1 to 20 carbon atoms, alkenyl having 2 to 20 carbon atoms, or aryl having 6 to 20 carbon atoms, whereby optional —$CH_2$— may be replaced by —O—, and optional hydrogen may be replaced by halogen, $R^7$ represents a single bond or a divalent organic group having 1 to 15 carbon atoms, and $R^8$ represents a trivalent organic group having 1 to 15 carbon atoms.

4. The varnish according to claim 3, wherein $R^6$ independently represents a fluoroalkyl or fluoroaryl.

5. The varnish according to claim 3 wherein $R^6$ independently represents trifluoromethyl, 3,3,3-trifluoropropyl, 3,3,4,4,5,5,6,6,6-nonafluorohexyl, tridecafluoro-1,1,2,2-tetrahydrooctyl, heptadecafluoro-1,1,2,2-tetrahydrodecyl, perfluoro-1H,1H,2H,2H-dodecyl, perfluoro-1H,1H,2H,2H-tetradecyl, pentafluorophenyl, or 4-fluorophenyl.

6. The varnish according to claim 3 wherein $R^8$ represents a benzenetriyl or trifluorobenzenetriyl.

7. The varnish according to claim 3, wherein R is an unsubstituted phenyl.

8. The varnish according to claim 3 wherein R is an unsubstituted phenyl and $R^6$ independently represents a fluoroalkyl or fluoroaryl.

9. The varnish according to claim 3 wherein R is an unsubstituted phenyl, and $R^6$ independently represents trifluoromethyl, 3,3,3-trifluoropropyl, 3,3,4,4,5,5,6,6,6-nonafluorohexyl, tridecafluoro-1,1,2,2-tetrahydrooctyl, heptadecafluoro-1,1,2,2-tetrahydrodecyl, perfluoro-1H,1H,2H,2H-dodecyl, perfluoro-1H,1H,2H,2H-tetradecyl, pentafluorophenyl, or 4-fluorophenyl.

10. The varnish according to claim 3 wherein R is an unsubstituted phenyl and $R^8$ represents a benzenetriyl or trifluorobenzenetriyl.

11. A liquid crystal display element which comprises an alignment layer formed by using the varnish according to claim 1.

12. A liquid crystal display element which comprises an alignment layer formed by using the varnish according to claim 3.

* * * * *